(12) United States Patent
Zurecki et al.

(10) Patent No.: US 7,513,121 B2
(45) Date of Patent: Apr. 7, 2009

(54) APPARATUS AND METHOD FOR IMPROVING WORK SURFACE DURING FORMING AND SHAPING OF MATERIALS

(75) Inventors: Zbigniew Zurecki, Macungie, PA (US); Ranajit Ghosh, Allentown, PA (US); John Herbert Frey, Allentown, PA (US); Lance Michael Grimm, Bowmanstown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 204 days.

(21) Appl. No.: 10/809,773

(22) Filed: Mar. 25, 2004

(65) Prior Publication Data
US 2005/0211029 A1    Sep. 29, 2005

(51) Int. Cl.
*F25D 17/02*    (2006.01)
*B05D 1/24*    (2006.01)
*B05C 1/00*    (2006.01)

(52) U.S. Cl. .............................. 62/64; 239/128; 82/1.11
(58) Field of Classification Search ...................... 62/64; 239/128; 82/1.1
See application file for complete search history.

(56) References Cited

U.S. PATENT DOCUMENTS

| | | | |
|---|---|---|---|
| 2,635,399 A | 4/1953 | West, Jr. .................... 51/266 |
| 2,641,047 A | 6/1953 | Jackman et al. | |
| 3,077,802 A * | 2/1963 | Philip ........................ 82/173 |
| 3,433,028 A | 3/1969 | Klee ........................... 62/45 |
| 3,571,877 A | 3/1971 | Zerkle | |
| 3,650,337 A | 3/1972 | Andrews et al. | |
| 3,696,627 A | 10/1972 | Longsworth .................... 62/51 |
| 3,751,780 A | 8/1973 | Villalobos | |
| 3,889,520 A | 6/1975 | Stoferle et al. | |
| 3,900,975 A | 8/1975 | Lighstone et al. | |
| 3,971,114 A * | 7/1976 | Dudley ........................ 407/120 |
| 3,979,981 A * | 9/1976 | Lightstone et al. ............. 83/15 |

(Continued)

FOREIGN PATENT DOCUMENTS

CN    87102713    4/1988

(Continued)

OTHER PUBLICATIONS

Biomedical Instrumentation and Tech., "Development of a High-Performance Multiprobe Cryosurgical Device", Chang, et al, 1994.

(Continued)

*Primary Examiner*—William C Doerrler
(74) *Attorney, Agent, or Firm*—Anne B. Kiernan

(57) ABSTRACT

A method and apparatus for improving the surface finish and/or surface integrity of a workpiece formed or shaped with a tool increase the surface hardness of the workpiece during forming or shaping of the workpiece. A method and apparatus for forming or shaping a workpiece also increase the surface hardness of the workpiece during forming or shaping of the workpiece with a tool, as do a method and apparatus for manufacturing a finished part or product from a workpiece. In some embodiments, an expanding jet of cryogen may be jetted to a surface of a workpiece and a tool from a nozzle, wherein the cryogen is at least partially separated into a condensed phase portion and a vapor portion within a downstream portion of the nozzle.

32 Claims, 6 Drawing Sheets

U.S. PATENT DOCUMENTS

| | | | |
|---|---|---|---|
| 4,083,220 A | 4/1978 | Kobayashi et al. | |
| 4,296,610 A | 10/1981 | Davis | 62/55 |
| 4,336,689 A | 6/1982 | Davis | 62/55 |
| 4,404,827 A | 9/1983 | Van den Sype | |
| 4,510,760 A | 4/1985 | Wieland | 62/49 |
| 4,547,470 A | 10/1985 | Tanase et al. | |
| 4,666,665 A | 5/1987 | Hornsby et al. | |
| 4,715,187 A | 12/1987 | Stearns | 62/55 |
| 4,716,738 A | 1/1988 | Tatge et al. | 62/55 |
| 4,788,842 A | 12/1988 | Kopp et al. | |
| 4,829,859 A | 5/1989 | Yankoff | 82/1.11 |
| 4,829,869 A | 5/1989 | Katada et al. | |
| 4,844,047 A * | 7/1989 | Brehm et al. | 125/13.01 |
| 4,848,198 A | 7/1989 | Royal et al. | |
| 5,025,547 A | 6/1991 | Sheu et al. | |
| 5,103,701 A | 4/1992 | Lundin et al. | 82/173 |
| 5,123,250 A | 6/1992 | Maric | 62/49.2 |
| 5,237,894 A | 8/1993 | Lindeke | |
| 5,265,505 A | 11/1993 | Frechette | 82/159 |
| 5,392,608 A | 2/1995 | Lee | 62/9 |
| 5,432,132 A | 7/1995 | Dasgupta et al. | |
| 5,449,647 A | 9/1995 | Brandt | |
| 5,477,691 A | 12/1995 | White | 62/50 |
| 5,509,335 A | 4/1996 | Emerson | 82/1.11 |
| 5,592,863 A | 1/1997 | Jaskowiak et al. | 82/1.11 |
| 5,597,272 A | 1/1997 | Moriguch | |
| 5,716,974 A | 2/1998 | Camaggi et al. | |
| 5,738,281 A | 4/1998 | Zurecki et al. | 239/290 |
| 5,761,941 A | 6/1998 | Matsui et al. | |
| 5,761,974 A | 6/1998 | Wang et al. | 82/1.11 |
| 5,762,381 A | 6/1998 | Vogel et al. | 285/330 |
| 5,799,553 A | 9/1998 | Billatos | |
| 5,862,833 A | 1/1999 | Perez | 137/625.11 |
| 5,878,496 A | 3/1999 | Liu et al. | 29/898.066 |
| 5,901,623 A * | 5/1999 | Hong | 82/50 |
| 6,010,283 A | 1/2000 | Henrich et al. | |
| 6,017,172 A | 1/2000 | Ukegawa et al. | |
| 6,053,669 A | 4/2000 | Lagerberg | |
| 6,105,374 A * | 8/2000 | Kamody | 62/64 |
| 6,145,322 A | 11/2000 | Odashima | 62/50.7 |
| 6,179,692 B1 | 1/2001 | Hara | 451/53 |
| 6,200,198 B1 | 3/2001 | Ukai et al. | 451/53 |
| 6,202,525 B1 | 3/2001 | Hendrickson et al. | |
| 6,305,183 B1 | 10/2001 | Mukai et al. | |
| 6,330,818 B1 | 12/2001 | Jain | |
| 6,332,385 B1 | 12/2001 | Kautto et al. | |
| 6,360,577 B2 | 3/2002 | Austin | |
| 6,454,877 B1 | 9/2002 | Kumar et al. | 148/222 |
| 6,513,336 B2 | 2/2003 | Zurecki et al. | |
| 6,564,682 B1 | 5/2003 | Zurecki et al. | |
| 6,622,570 B1 | 9/2003 | Prevey, III | 73/826 |
| 6,652,200 B2 * | 11/2003 | Kraemer | 407/11 |
| 6,658,907 B2 | 12/2003 | Inoue et al. | 72/53 |
| 6,666,061 B2 | 12/2003 | Heimann | 72/110 |
| 6,675,622 B2 | 1/2004 | Plicht et al. | |
| 6,815,362 B1 | 11/2004 | Wong et al. | |
| 6,874,344 B1 | 4/2005 | Junius et al. | |
| 2002/0040905 A1* | 4/2002 | Groll | 220/573.2 |
| 2002/0150496 A1 | 10/2002 | Chandrasekar et al. | |
| 2002/0174528 A1 | 11/2002 | Prevey, III | 29/90.01 |
| 2002/0189413 A1 | 12/2002 | Zurecki et al. | |
| 2003/0110781 A1 | 6/2003 | Zurecki et al. | 62/64 |
| 2003/0145694 A1 | 8/2003 | Zurecki et al. | 82/1.11 |
| 2004/0043626 A1 | 3/2004 | Chou San et al. | |
| 2004/0154443 A1 | 8/2004 | Zurecki et al. | |
| 2004/0232258 A1 | 11/2004 | Cerv et al. | |
| 2004/0234350 A1 | 11/2004 | Jager et al. | |
| 2004/0237542 A1 | 12/2004 | Zurecki et al. | |
| 2005/0011201 A1 | 1/2005 | Zurecki et al. | |
| 2005/0016337 A1 | 1/2005 | Zurecki et al. | |
| 2005/0211029 A1 | 9/2005 | Zurecki et al. | |
| 2007/0175255 A1 | 8/2007 | Pawelski et al. | |

FOREIGN PATENT DOCUMENTS

| | | |
|---|---|---|
| DE | 4326517 A1 | 8/1993 |
| DE | 19600172 A1 | 8/1997 |
| DE | 19730539 C1 | 4/1999 |
| EP | 0842722 A1 | 5/1998 |
| EP | 0711663 B1 | 7/1999 |
| EP | 0945222 A2 | 9/1999 |
| EP | 1580284 A2 | 9/2005 |
| EP | 1637257 A1 | 3/2006 |
| FR | 2804492 A1 | 8/2001 |
| JP | 328397 | 11/1953 |
| JP | 63-62637 | 12/1988 |
| JP | 6031502 A1 | 2/1994 |
| JP | 6210105 | 8/1994 |
| JP | 6330077 A2 | 11/1994 |
| JP | 2724337 A1 | 3/1996 |
| JP | 8-276564 | 10/1996 |
| JP | 09-300172 | 11/1997 |
| JP | 11320328 A1 | 11/1999 |
| JP | 200065291 A1 | 3/2000 |
| JP | 200252079 | 9/2000 |
| JP | 2000296438 A1 | 10/2000 |
| JP | 2002059336 | 2/2002 |
| JP | 11156669 A1 | 12/2007 |
| WO | 92/16464 A1 | 10/1992 |
| WO | 9708486 | 3/1997 |
| WO | 98/10893 A1 | 3/1998 |
| WO | 9960079 | 11/1999 |
| WO | WO 99/60079 | 11/1999 |
| WO | WO99/60079 * | 11/1999 |
| WO | 02096598 | 5/2002 |
| WO | WO02/096598 * | 5/2002 |
| WO | 03022517 | 8/2002 |
| WO | WO 02/096598 | 12/2002 |
| WO | 03/002277 A1 | 1/2003 |
| WO | 03066916 | 1/2003 |
| WO | 2005/120739 A1 | 12/2005 |

OTHER PUBLICATIONS

"Heat Transfer in Cutting Inserts", Kabala Andrze, Experimental Stress Analysis 2001.

"Applications of Ceramic Cutting Tools", Key Engineering Materials, vol. 138-140 (1998).

"The Use of High Speed Machining for the Manufacture of Hardened Steel Dies", Trans. NAMRI/SME, 1996.

T.J. Broskea et al., MMS Online (www.mmsonline.com/articles).

E.M. Trent and P.K. Wright, "Metal Cutting", 4th Ed., Butterworth, Boston, Oxford, 2000.

ASM Handbook, 9th Ed., vol. 16, *"Machining Ceramic Materials,"* 1995.

Zurecki and Harriott, "Industrial Systems for Cost Effective Machining of Metals Using an Environmentally Friendly Liquid Nitrogen Coolant", Aerospace Mfg. Tech. Conf. 1998. Paper No. 981,865.

Zurecki et al., "Dry Machining of Metals With Liquid Nitrogen", the 3rd Intl. Machining & Grinding '99.

J. Lin et al., "Estimation of Cutting Temperature in High Speed Machining", Trans. of the ASME, vol. 114.

S545-type milling cutter made by Niagara Cutter(http://www.niagaracutter.com/techinfo).

"Machining Data Handbook," 3rd Edition, vol. 1 and 2, Machinability DataCenter, IAMS, Inc. 1980.

"Application of Metal Cutting Theory," F.E. Gorczyca, Industrial Press, New York, 1987.

"Analysis of Material Removal Processes," W.R. DeVries, Springer Texts in Mechanical Eng., Springer-Verlag, 1992.

"Ceramics and Glasses, Engineered Materials Handbook," vol. 4, ASM Int., The Matls Information Soc., '91.

ASM Specialty Handbook, "Tool Materials," Ed. J.R. Davis, 1998.

"Microstructural Effects in Precision Hard Turning," Y.K. Chou; C.J. Evans, MED-vol. 4, Mfg. Sci. and Engr., ASME 1996.

"Temperature and wear of cutting in high-speed machining of Inconel 710 and Ti6Al-6V-2Sn," T. Kitagawa, et al., Wear 202 (1997), Elsevier, pp. 142-148.

"The Leidenfrost phenomenon", F.L. Curzon, Am. J. Phys., 46 (8), Aug. 1978, pp. 825-828.

"A boiling heat transfer paradox", G.G. Lavalle et al., Am. J. Phys., vol. 60, No. 7, Jul. 1992, pp. 593-597.

"Cooling by immersion in liquid nitrogen", T.W. Listerman et al., Am. J. Phys., 54 (6), Jun. '86, pp. 554-558.

"An Analytical Method to Determine the Liquid Film Thickness Produced by Gas Atomized Sprays", J.Yang et al., J. of Heat Transfer, Feb. 1996, vol. 118, pp. 255-258.

"Optimizing and Predicting Critical Heat Flux in Spray Cooling of a Square Surface", I. Mudawar and K.A. Estes, J. of Heat Transfer, Aug. 1996, vol. 118, pp. 672-679.

"Film Boiling Under an Impinging Cryogenic Jet", R.F. Barron and R.S. Stanley, Advances in Cryogenic Engineering, vol. 39, Ed. P. Kittel, Plenum Press, New York, 1994, pp. 1769-1777.

"CRC Materials Sci. & Engineering Handbook," $2^{nd}$ Edition, CRC Press, 1994, Edited by J.F. Shackelford et al.

"Transport Phenomena," R.R. Bird et al., John Wiley & Sons, 1960.

"Numerical and Experimental Simulation for Cutting Temperature Estimation using 3-dimensional Inverse Heat Conduction Technique," F.R.S. Lima, et al.

"White Layer Formation at Machined Surfaces and . . . ," B.J. Griffins, J. of Tribology, vol. 107/165, Apr. 1985.

"Machining Hard Materials with Geometrically . . . ," W. Konig, et al, Annals of CIRP, vol. 57, 1990.

"Potential and Limitations of Hard Turning . . . ," H.K. Tonshoff, et al, $1^{st}$ Int. Machining and Grinding Conf. 1995.

"PCBN Tool Failure Mode Analysis," T.J. Broskea, Intertech 2000.

"Process Effects on White Layer Formation in Hard Turning," Y.K. Chou, et al, NAMRI/SME, 1998.

"Ceramics and Glasses, Engineered Mat. Handbook", vol. 4 ASM Int., The Mat. Info. Soc., 1991.

"Microstructural Effects in Precision Hard Turning", Chou, et al, MED-vol. 4 ASME 1996.

"Temperature and wear of cutting tools in high-speed machining . . ." Kitagawa, et al, Wear 202 1997.

"Applications of Ceramic Cutting Tools," Mehrotra, Key Engr. Mat. vol. 138-140, 1998.

"Cutting Tools," Edwards, The Institute of Mat., 1993.

"Performance of Ceramic Cutting Tools in Turning Operations," D'errico, et al, Ind. Ceraminc, vol. 17, 1997.

"Tool Materials," ASM Specialty Handbook, 1995, p. 73.

"The Use of High Speed Machining for the Manufacture of Hardened . . . ", Dewes, et al, NAMRI/SME vol. 14.

"Metal Cutting," Trent, et al, $4^{th}$ Edition, Butterworth Heinemann, Boston, Oxford, 2000.

"Machining," Metals Handbook $9^{th}$ Edition, vol. 16, 1996.

Thiele, et al., "Effect of Cutting Edge Geometry and Workpiece Hardness on Surface Generation in the finish Hard Turning of AISI 52100 Steel", Journal of Materials Processing Technology, 94 (1999), pp. 216-226.

Ozel, et al., "Effects of Cutting Edge Geometry, Workpiece Hardness, Feed Rate and Cutting Speed on Surface Roughness and Forces in Finish Turning of Hardened AISI H13 Steel", Department of Industrial and Systems Engineering, Rutgers, The State University of New Jersey, Piscataway, New Jersey 08854 USA, pp. 1-33.

J. Y. Huang, et al., "Microstructure of Cryogenic Treated M2 Tool Steel," Materials Science and Engineering A339 (2003) 241-244.

Chang-Xue (Jack) Feng, "An Experimental Study of the Impact of Turning Parameters on Surface Roughness", Paper No. 2036, Proceedings of the 2001 Industrial Engineering Research Conference, pp. 1-9.

Orlowicz, et al., "Effect of Rapid Solidification on Sliding Wear of Iron Castings", Wear 254 (2003), pp. 154-163.

Majumdar, et al., "Laser Surface Alloying—An Advanced Surface Modification Technology", Department of Metallurgical and Materials Engineering Indian Institute of Technology, Kharagpur-721302, India, I. W. W., Technical University of Clausthal, D-38678 Clausthal Zellerfield, Germany, pp. 1-11.

Gunnberg, F., Surface Integrity of Hard Turned PM Steel, Thesis Dept. of Product Development, Chalmers University of Technology, 412 96 Goteborg, Sweden, 2003.

Hong, Shane Y., et al., Micro-temperature Manipulation in Cryogenic Machining of Low Carbon Steel, Elsevier Journal of Materials Processing Technology 116 (2001) pp. 22-30.

"Mechanical Engineering Handbook (2nd Edition)", Editorial Board of Mechanical Engineering Handbook and Electrical Engineering Handbook, p. 1-16, 1-30, 4-3 and 2-41, China Machine Press.

U.S. Appl. No. 09/870,853, filed May 31, 2001, Zurecki, Zbigniew et al.

U.S. Appl. No. 10/066,830, filed Feb. 4, 2002, Zurecki, Zbigniew et al.

U.S. Appl. No. 09/951,195, filed Sep. 13, 2001, Zurecki, Zbigniew et al.

U.S. Appl. No. 11/221,718, filed Sep. 9, 2005, Ghosh, Ranajit et al.

U.S. Appl. No. 11/250,346, filed Oct. 14, 2005, Zurecki, Zbigniew et al.

* cited by examiner

APPARATUS AND METHOD FOR IMPROVING WORK SURFACE DURING FORMING AND SHAPING OF MATERIALS

BACKGROUND OF THE INVENTION

The present invention relates to the field of forming and shaping of materials by various processes, including but not limited to cutting (e.g., shaping parts by removing excess material in the form of chips) and other types of machining, and more particularly improving surface finish and surface integrity of metals and other engineering materials (e.g., polymers and various types of composite materials) formed and shaped through such processes by utilizing cryogenic cooling and other types of treatments, including but not limited to heat treatment, chemical treatment, and mechanical treatment.

As used herein, the term "cutting" includes but is not limited to the following operations: turning, boring, parting, grooving, facing, planning, milling, drilling, and other operations which generate continuous chips or fragmented or segmented chips. The term cutting does not include: grinding, electro-discharge machining, or high-pressure jet erosion cutting, i.e., abrasive operations generating very fine chips that are not well defined in shape, e.g., dust or powder.

The term "integrity," as used herein, relates to quality, and more specifically to the desired state of residual stresses in the processed work surface, dimensional accuracy affected by wearing tools, and/or the absence of artifacts or other undesired alterations of surface that often result from the conventional forming or shaping processes.

There is a need in the manufacturing industries to produce more parts or products faster, i.e., to produce each part or product faster and without increasing the cost per part or comprising part quality. More specifically, there is a need for improved methods which minimize the number and/or the extent of manufacturing steps required to produce a specific, good quality part or product, such as soft roughing, typically carried out before heat treatment, or finish grinding and polishing/honing, typically carried out following heat treatment, or cleaning steps, usually carried out on parts, machine tools, and in a work environment due to the contamination caused by conventional machining fluids. Moreover, there is an industrial interest in eliminating or minimizing the extent of various peening, burnishing, deburring, and localized deep-rolling operations completing the forming or machining process cycle and used, in the case of many metallic products, to enhance the mechanical surface integrity or remove detrimental tensile stresses produced during forming or machining. There also is a need for improved methods to accelerate forming and machining operations, minimize capital expenses, e.g., the number of machine tools required to reach specific production targets, and/or reduce the cost of tooling and associated consumables.

U.S. Pat. No. 5,878,496 (Liu, et al.) discloses a method for reducing the number of machining steps while producing hard work parts with an acceptable surface finish by an experimentation and modeling-based manipulation of conventional machining parameters including tool feedrate and nose radius. The patent does not, however, teach how to improve productivity, increase cutting tool life, or reduce the roughness of a work surface.

There exists a relatively large body of prior art publications pertaining to some form of cryogenic spraying or jetting to eliminate cleaning operations, effect productivity of various types of cutting tools, and/or prevent undesired microstructural changes within machined surfaces. See, for example, WO02/096598A1 (Zurecki, et al.), WO99/60079 (Hong), U.S. Pat. Application Nos.: 2003/0145694A1 (Zurecki, et al.) and 2003/0110781A1 (Zurecki, et al.), and U.S. Pat. No.: 5,901,623 (Hong), U.S. Pat. No. 5,509,335 (Emerson), U.S. Pat. No. 4,829,859 (Yankoff), and U.S. Pat. No. 3,971,114 (Dudley). However, none of these publications nor the other prior art references discussed herein solve the problems or satisfy the needs discussed herein.

U.S. Pat. No. 5,761,974 (Wang, et al.) discloses the use of a cryogenic heat-exchanger in contact with the workpiece contacting edge of a cutting tool, whereby direct contact between the cryogenic fluid and the workpiece is avoided by use of the heat exchanger. U.S. Pat. No. 5,103,701 (Lundin, et al.) discloses that cryogenic freezing of an entire workpiece may result in an improvement of tool life when a sharp-edged diamond cutting tool is contacted with ferrous work materials. The methods taught by these two patents improve tool productivity, but the first method cannot effectively control work surface finish and integrity, and the second method requires extensive machine tool modifications that would be unacceptably expensive in most industrial applications.

U.S. Pat. No. 5,592,863 (Jaskowiak, et al.) discloses a method using cryogenic cooling to produce discontinuous chips from a continuous chip formed during machining of a polymer workpiece. By cooling the chip, rather than the cutting tool or the polymer workpiece, the method does not improve tool productivity or workpiece surface finish and integrity.

U.S. Pat. No. 6,622,570 B1 (Pervey, III) and U.S. Pat. Application No. 2002/0174528A1 (Prevey, III) disclose methods for eliminating undesired tensile stresses in a work surface that result from various manufacturing operations (e.g., turning) and for imparting desired, compressive stresses. Compressive residual stress in a work surface is known to enhance fatigue strength and fatigue life of product parts while reducing their sensitivity to stress corrosion cracking. An enhanced resistance to stress corrosion cracking and to other stress-accelerated forms of metal corrosion is invaluable to metal component producers and users. The key methods for correcting residual surface stress distribution (i.e., increasing its compressive component) include shot peening and laser peening, both of which are known to deteriorate or damage work surface finish and increase work roughness if applied to their fullest extent. Further illustration of this problem is found in U.S. Pat. No. 6,658,907 B2 (Inoue, et al.) and in U.S. Pat. No. 6,666,061 B2 (Heimann), the latter dealing with deep-rolling, another stress fixing method applied to the surface of manufactured parts. These four patent publications show two critical and still unsolved issues facing the industry: (a) a frequent need for an additional, expensive manufacturing step fixing residual surface stresses and following the forming or shaping steps, and (b) the present trade-offs between the surface finish and the compressive stress imparted during the stress fixing operations. Clearly, there is an unsatisfied need for an improved forming, shaping and machining technique which would enhance surface finish and compressive stresses at the same time without requiring additional manufacturing steps.

Others have reported that during the conventional, non-cryogenic turning of hard steels, a sharp cutting edge improves the surface finish and/or somewhat enhances the desired compressive residual stresses, while a rounded or honed edge, preferred from the tool-life and productivity standpoint, makes the workpiece surface rougher and/or less compressed. J. D. Thiele and S. N. Melkote, *Effect of cutting edge geometry and workpiece hardness on surface generation in the finish hard turning of AISI 52100 steel, Journal of*

*Materials Processing Technology*, 94 (1999) 216-226; and F. Gunnberg, "Surface Integrity Generated by Hard Turning," Thesis, Dept. of Product Development, Chalmers University of Technology, Goteborg, Sweden, 2003. The impact of the honed edge geometry on work surface finish was observed to lessen with increasing work material hardness, but no conclusions were drawn regarding the prospect of controlling surface finish and integrity by modifying work surface hardness before or during machining operations while maintaining an acceptable tool life and high productivity.

Also, experimental roughness data which has been reported for very similar machining conditions underlined the tentative nature of material hardness effect suggested by Thiele and Melkote, showing that the roughness increases whenever the work hardness increases. See, T. Ozel, Tsu-Kong Hsu, and E. Zeren, *Effects of Cutting Edge Geometry, Workpiece Hardness, Feed Rate and Cutting Speed on Surface Roughness and Forces in Finish Turning of Hardened AISI H13 Steel, International Journal of Advanced Manufacturing Technology* (2003).

Thus, the prior art offers only fragmented and incomplete, if not contradicting, solutions to the industrial needs discussed above, and demonstrates the need for a more comprehensive method for reducing manufacturing steps and costs while improving work surface finish and integrity. Specific areas that require a single, comprehensive solution include (a) effectiveness of cooling and hardening of cutting tools during machining using cryogenic jetting, which is preferred for its ability to reduce tool wear and costs, increase production rates, and eliminate cleaning steps from the manufacturing process, (b) application of cryogenic jetting to minimize roughness and maximize compressive stresses of work surface produced during machining so that no additional finishing steps are required, and (c) further modifications of work material properties before and during cutting that minimize machined surface roughness and, thus, eliminate the need for finish grinding steps.

It is desired to have a method and an apparatus for improving the surface finish and integrity of a workpiece which satisfy the above needs and address the problems discussed herein.

It is further desired to have a method and an apparatus for improving the surface finish and integrity of a workpiece which overcome the difficulties and disadvantages of the prior art to provide better and more advantageous results.

It is still further desired to have a method and an apparatus for forming or shaping a workpiece which overcome the difficulties and disadvantages of the prior art to provide better and more advantageous results.

It is also desired to have a method and an apparatus for manufacturing finished parts and products which would eliminate one or more steps or elements required in prior art manufacturing processes and systems.

BRIEF SUMMARY OF THE INVENTION

Applicants' invention is a method and an apparatus for improving the surface finish and /or surface integrity of a workpiece formed or shaped with a tool. Another aspect of the invention is a method and an apparatus for forming or shaping a workpiece. Yet another aspect of the invention is a method and an apparatus for manufacturing a finished part or a finished product from a workpiece. Other aspects of the invention are a workpiece formed or shaped by the method and apparatus for forming or shaping a workpiece, and a finished part or a finished product manufactured by the method and apparatus for manufacturing. The invention also includes a nozzle for jetting an expanding jet of a cryogen to a surface of a workpiece.

A first embodiment of the method for improving at least one of a surface finish and a surface integrity of a workpiece formed or shaped with a tool, the workpiece having a surface hardness, includes increasing the surface hardness of the workpiece during forming or shaping of the workpiece with the tool. ("Surface finish" and "surface integrity" are defined and discussed in the Background of the Invention section above and in the Detailed Description of the Invention section below.) There are several variations of the first embodiment of this method.

In one variation, the surface hardness of the workpiece is increased by cooling with a cryogenic fluid at least a portion of the tool, or at least a portion of the workpiece, or at least a portion of the tool and at least a portion of the workpiece. In a variant of this variation, the jet of the cryogenic fluid impinges on a portion of the tool and a portion of a surface of the workpiece. There are several variations of this variant.

In one variation of the variant, the jet of the cryogenic fluid impinges on the portion of the tool at an impingement angle ($\alpha$) greater than about 0° and less than about 90°. In another variation, the jet of the cryogenic fluid impinges on the portion of the tool at an impingement angle ($\alpha$) greater than about 30° and less than about 90°. In yet another variation, the jet of the cryogenic fluid impinges on the surface of the workpiece at a spread angle ($\beta$) greater than about 0° and less than about 180°.

A second embodiment of the method for improving at least one of a surface finish and a surface integrity of a workpiece formed or shaped with a tool, the workpiece having a surface hardness, includes increasing the surface hardness of the workpiece prior to forming or shaping the workpiece with a tool, or during forming or shaping of the workpiece with the tool, or both prior to and during forming or shaping of the workpiece with the tool. In a variation of this embodiment, the surface hardness of the workpiece is increased by at least one of a heat treatment, a chemical treatment, and a mechanical treatment.

A third embodiment of the method for improving at least one of a surface finish and a surface integrity of a workpiece machined with a cutting tool, the workpiece having a surface hardness, includes increasing the surface hardness of the workpiece during machining of the workpiece with the cutting tool, wherein the surface hardness of the workpiece is increased by cooling with a cryogenic fluid at least a portion of the cutting tool and at least a portion of the workpiece, and a jet of the cryogenic fluid impinges on a portion of the cutting tool at an impingement angle ($\alpha$) greater than about 0° and less than about 90°, and the jet of the cryogenic fluid impinges on the surface of the workpiece at a spread angle ($\beta$) greater than about 0° and less than about 180°.

A fourth embodiment of the method for improving at least one of a surface finish and a surface integrity of a workpiece formed or shaped with a tool includes multiple steps. The first step is to provide a supply of a cryogen. The second step is to provide a nozzle adjacent the workpiece. The nozzle includes multiple elements. The first element is at least one inlet adapted to receive a flow of the cryogen. The second element is an upstream portion in fluid communication with the at least one inlet, the upstream portion adapted to receive at least a portion of the flow of the cryogen from the at least one inlet. The third element is a downstream portion in fluid communication with the upstream portion and adapted to receive at least a portion of the flow of the cryogen from the upstream portion. The fourth element is at least one outlet in fluid communication with the downstream portion and adapted to receive and transmit from the downstream portion at least a portion of the flow of the cryogen. The third step is to deliver a portion of the cryogen to the at least one inlet of the nozzle, wherein the cryogen is at least partially separated within the downstream portion of the nozzle into a condensed phase portion and a vapor portion. The fourth step is to jet at least a portion of an expanding jet of the condensed phase portion and the vapor portion from the at least one outlet of the nozzle to the tool and a surface of the workpiece.

In a variation of the fourth embodiment, the downstream portion of the nozzle has at least one diverging wall and at least one converging wall adapted to converge on the expanding jet. In a variant of that variation, the at least one diverging wall has a diverging angle and the at least one converging wall has a converging angle less than the diverging angle. In another variant, the diverging wall is open to an ambient atmosphere.

Another embodiment is a method for improving at least one of a surface finish and a surface integrity of a workpiece machined with a cutting tool. This embodiment includes multiple steps. The first three steps of this embodiment are the same as the first three steps of the fourth embodiment of the method discussed above. The fourth step is to jet at least a portion of an expanding jet of the condensed phase portion and the vapor portion from the at least one outlet of the nozzle to the cutting tool and a surface of the workpiece, wherein the downstream portion of the nozzle has at least one diverging wall open to an ambient atmosphere and at least one converging wall adapted to converge on the expanding jet, and wherein the at least one diverging wall has a diverging angle and the at least one converging wall has a converging angle less than the diverging angle.

Another aspect of the invention is a method for forming or shaping a workpiece having a surface hardness. A first embodiment of this method includes multiple steps. The first step is to provide a tool adjacent the workpiece, the tool adapted to form or shape the workpiece. The second step is to form or shape the workpiece with the tool. The third step is to increase the surface hardness of the workpiece during forming or shaping of the workpiece with the tool.

Another aspect of the invention is a workpiece formed or shaped by the above-described method, the workpiece characterized by an improved surface finish, an improved surface integrity, or both an improved surface finish and an improved surface integrity. There are several variations of this aspect of the invention.

In one variation, the workpiece has a work surface roughness (Ra), wherein the work surface roughness (Ra) is equal to or less than a theoretical low roughness limit (Ra-t), calculated as Ra-t=$f^2/(32\,r)$, where f is a cutting tool feedrate and r is a cutting tool nose radius.

In another variation, the workpiece has a formed or shaped work surface characterized by an improved residual stress, said improved residual stress being more compressive, deeper extending, or both more compressive and deeper extending than another residual stress that would be obtained by forming or shaping the workpiece without increasing the surface hardness of the workpiece during forming or shaping of the workpiece.

In yet another variation, the workpiece contains at least one metallic alloy having at least one element selected from a group consisting of cobalt (Co), chromium (Cr), molybdenum (Mo), nickel (Ni), iron (Fe), tungsten (W), aluminum (Al), titanium (Ti), tantalum (Ta), niobium (Nb) and vanadium (V).

There are still yet other variations of this aspect of the invention. In one such variation, the workpiece is in a form selected from a group consisting of a cast form, wrought form, powder metallurgy form, and composite form. In another variation, the workpiece contains at least one polymer or at least one polymer-based composite. In yet another variation, the workpiece has a formed or shaped work surface characterized by at least one of an improved fatigue strength, an improved fatigue life, an improved stress-cracking resistance, and an improved corrosion resistance.

Another embodiment, a method for machining a workpiece having a surface hardness, includes multiple steps. The first step is to provide a cutting tool adjacent the workpiece, the cutting tool adapted to shape the workpiece. The second step is to shape the workpiece with the cutting tool. The third step is to increase the surface hardness of the workpiece during shaping of the workpiece with the cutting tool, wherein the shaped workpiece is characterized by an improved surface finish having a work surface roughness (Ra) equal to or less than a theoretical low roughness limit (Ra-t), calculated as Ra-t=$f^2/(32\,r)$, where f is a cutting tool feedrate and r is a cutting tool nose radius.

Another aspect of the invention is a method for manufacturing a finished part or a finished product from a workpiece having a surface hardness. One embodiment of the method includes multiple steps. The first step is to provide a tool adjacent the workpiece, the tool adapted to form or shape the workpiece. The second step is to form or shape the workpiece with the tool. The third step is to increase the surface hardness of the workpiece during forming or shaping of the workpiece with the tool. The fourth step is to manufacture the finished part or the finished product from the workpiece shaped or formed with the tool.

In one variation of this method, the finished part or the finished product is manufactured from the workpiece without using at least one additional operation needed by at least one other method for manufacturing a comparable finished part or a comparable finished product which the other method forms or shapes from a comparable workpiece having a comparable surface hardness without increasing the comparable surface hardness of the comparable workpiece during forming or shaping of the comparable workpiece, said at least one additional operation being selected from a group consisting of grinding, polishing, honing, deburring, peening, tumbling, burnishing, deep rolling, soft annealing, soft machining, soft shaping, soft forming, and work part cleaning.

Another aspect of the invention is a finished part or a finished product manufactured by the method described above and characterized by a reduced manufacturing cost, said reduced manufacturing cost being less than a higher manufacturing cost for a comparable finished part or a comparable finished product manufactured by at least one other method which forms or shapes a comparable workpiece having a comparable surface hardness without increasing the comparable surface hardness of the comparable workpiece during forming or shaping of the comparable workpiece.

Another embodiment of the method for manufacturing a finished part from a workpiece having a surface hardness includes multiple steps. The first step is to provide a cutting tool adjacent the workpiece, the cutting tool adapted to shape the workpiece. The second step is to shape the workpiece with the cutting tool. The third step is to increase the surface hardness of the workpiece during shaping of the workpiece with the cutting tool. The fourth step is to manufacture the finished part from the workpiece shaped with the cutting tool, wherein the finished part is manufactured from the workpiece without using at least one additional operation needed by at least one other method for manufacturing a comparable finished part which the other method shapes from a comparable workpiece having a comparable surface hardness without increasing the comparable surface hardness of the comparable workpiece during shaping of the comparable workpiece, said at least one additional operation being selected from a group consisting of grinding, polishing, honing, deburring, peening, tumbling, burnishing, deep rolling, soft annealing, soft machining, soft shaping, soft forming, and work part cleaning.

A first embodiment of the apparatus for improving at least one of a surface finish and a surface integrity of a workpiece formed or shaped with a tool, the workpiece having a surface hardness, includes means for increasing the surface hardness of the workpiece during forming or shaping of the workpiece with the tool. There are several variations of the first embodiment of this apparatus.

In one variation, the surface hardness of the workpiece is increased by cooling with a cryogenic fluid at least a portion of the tool, or at least a portion of the workpiece, or at least a portion of the tool and at least a portion of the workpiece. In a variant of this variation, the jet of the cryogenic fluid impinges on a portion of the tool and a portion of a surface of the workpiece. There are several variations of this variant.

In one variation of the variant, the jet of the cryogenic fluid impinges on the portion of the tool at an impingement angle ($\alpha$) greater than about 0° and less than about 90°. In another variation, the jet of the cryogenic fluid impinges on the portion of the tool at an impingement angle ($\alpha$) greater than about 30° and less than about 90°. In yet another variation, the jet of the cryogenic fluid impinges on the surface of the workpiece at a spread angle ($\beta$) greater than about 0° and less than about 180°.

A second embodiment of the apparatus for improving at least one of a surface finish and a surface integrity of a workpiece formed or shaped with a tool, the workpiece having a surface hardness, includes means for increasing the surface hardness of the workpiece prior to forming or shaping the workpiece with the tool, or during forming or shaping of the workpiece with the tool, or both prior to and during forming or shaping of the workpiece with the tool. In a variation of this embodiment, the surface hardness of the workpiece is increased by at least one of a heat treatment, a chemical treatment, and a mechanical treatment.

A third embodiment of the apparatus for improving at least one of a surface finish and a surface integrity of a workpiece machined with a cutting tool, the workpiece having a surface hardness, includes means for increasing the surface hardness of the workpiece during machining of the workpiece with the cutting tool, wherein the surface hardness of the workpiece is increased by cooling with a cryogenic fluid at least a portion of the cutting tool and at least a portion of the workpiece, and a jet of the cryogenic fluid impinges on a portion of the cutting tool at an impingement angle ($\alpha$) greater than about 0° and less than about 90°, and the jet of the cryogenic fluid impinges on the surface of the workpiece at a spread angle ($\beta$) greater than about 0° and less than about 180°.

A fourth embodiment of the apparatus for improving at least one of a surface finish and a surface integrity of a workpiece formed or shaped with a tool includes multiple elements. The first element is a supply of a cryogen. The second element is a nozzle adjacent the workpiece. The nozzle includes multiple sub-elements. The first sub-element is at least one inlet adapted to receive a flow of the cryogen. The second sub-element is an upstream portion in fluid communication with the at least one inlet, the upstream portion adapted to receive at least a portion of the flow of the cryogen from the at least one inlet. The third sub-element is a downstream portion in fluid communication with the upstream portion and adapted to receive at least a portion of the flow of the cryogen from the upstream portion. The fourth sub-element is at least one outlet in fluid communication with the downstream portion and adapted to receive and transmit from the downstream portion at least a portion of the flow of the cryogen. The third element of the apparatus is a means for delivering a portion of the cryogen to the at least one inlet of the nozzle, wherein the cryogen is at least partially separated within the downstream portion of the nozzle into a condensed phase portion and a vapor portion. The fourth element is a means for jetting at least a portion of an expanding jet of the condensed phase portion and the vapor portion from the at least one outlet of the nozzle to the tool and the surface of the workpiece.

In a variation of the fourth embodiment, the downstream portion of the nozzle has at least one diverging wall and at least one converging wall adapted to converge on the expanding jet. In a variant of this variation, the at least one diverging wall has a diverging angle and the at least one converging wall has a converging angle less than the diverging angle. In another variant, the diverging wall is open to an ambient atmosphere.

Another embodiment is an apparatus for improving at least one of a surface finish and a surface integrity of a workpiece machined with a cutting tool. This embodiment includes multiple elements. The first three elements are the same as the first three elements of the fourth embodiment of the apparatus discussed above. The fourth element is a means for jetting at least a portion of an expanding jet of the condensed phase portion and the vapor portion from the at least one outlet of the nozzle to the cutting tool and a surface of the workpiece, wherein the downstream portion of the nozzle has at least one diverging wall open to an ambient atmosphere and at least one converging wall adapted to converge on the expanding jet, and wherein the at least one diverging wall has a diverging angle and the at least one converging wall has a converging angle less than the diverging angle.

Another aspect of the invention is an apparatus for forming or shaping a workpiece having a surface hardness. A first embodiment of this apparatus includes multiple elements. The first element is a tool adjacent the workpiece, the tool adapted to form or shape the workpiece. The second element is a means for forming or shaping the workpiece with the tool. The third element is a means for increasing the surface hardness of the workpiece during forming or shaping of the workpiece with the tool.

Another aspect of the invention is a workpiece formed or shaped by the above-described apparatus and characterized by an improved surface finish, an improved surface integrity, or both an improved surface finish and an improved surface integrity. There are several variations of this aspect of the invention.

In one variation, the workpiece has a work surface roughness (Ra), wherein the work surface roughness (Ra) is equal to or less than a theoretical low roughness limit (Ra-t), calculated as Ra-t=$f^2/(32\,r)$, where f is a cutting tool feedrate and r is a cutting tool nose radius.

In another variation, the workpiece has a formed or shaped work surface characterized by an improved residual stress, said improved residual stress being more compressive, deeper extending, or both more compressive and deeper extending than another residual stress that would be obtained by forming or shaping the workpiece without using a means for increasing the surface hardness of the workpiece during forming or shaping of the workpiece.

In yet another variation, the workpiece contains at least one metallic alloy having at least one element selected from a group consisting of cobalt (Co), chromium (Cr), molybdenum (Mo), nickel (Ni), iron (Fe), tungsten (W), aluminum (Al), titanium (Ti), tantalum (Ta), niobium (Nb) and vanadium (V).

There are still yet other variations of the workpiece. In one such variation, at least a portion of the workpiece is in a form selected from a group consisting of a cast form, wrought form, powder metallurgy form, and composite form. In another variation, the workpiece contains at least one polymer or at least one polymer-based composite. In yet another variation, the workpiece has a formed or shaped work surface characterized by at least one of an improved fatigue strength, an improved fatigue life, an improved stress-cracking resistance, and an improved corrosion resistance.

Another embodiment, an apparatus for machining a workpiece having a surface hardness, includes multiple elements. The first element is a cutting tool adjacent the workpiece, the cutting tool adapted to shape the workpiece. The second element is a means for shaping the workpiece with the cutting tool. The third element is a means for increasing the surface hardness of the workpiece during shaping of the workpiece with a cutting tool, wherein the shape of the workpiece is characterized by an improved surface finish having a work surface roughness (Ra) equal to or less than a theoretical low roughness limit (Ra-t), calculated as Ra-t=$f^2/(32\,r)$, where f is a cutting tool feedrate and r is a cutting tool nose radius.

Another aspect of the invention is an apparatus for manufacturing a finished part or a finished product from a workpiece having a surface hardness. One embodiment of the apparatus includes multiple elements. The first element is a tool adjacent the workpiece, the tool adapted to form or shape the workpiece. The second element is a means for forming or shaping the workpiece with the tool. The third element is a means for increasing the surface hardness of the workpiece during forming or shaping of the workpiece with the tool. The fourth element is a means for manufacturing the finished part or the finished product from the workpiece shaped or formed with the tool.

In one variation of this apparatus, the finished part or the finished product is manufactured from the workpiece without using at least one additional operation needed by at least one other apparatus for manufacturing a comparable finished part or a comparable finished product which the other apparatus forms or shapes from a comparable workpiece having a comparable surface hardness without increasing the comparable surface hardness of the comparable workpiece during forming or shaping of the comparable workpiece, said at least one additional operation being selected from a group consisting of grinding, polishing, honing, deburring, peening, tumbling, burnishing, deep rolling, soft annealing, soft machining, soft shaping, soft forming, and work part cleaning.

Another aspect of the invention is a finished part or a finished product manufactured by the apparatus described above and characterized by a reduced manufacturing cost, said reduced manufacturing cost being less than a higher manufacturing cost for a comparable finished part or a comparable finished product manufactured by at least one other apparatus which forms or shapes a comparable workpiece having a comparable surface hardness without increasing the comparable surface hardness of the comparable workpiece during forming or shaping of the comparable workpiece.

Another embodiment of the apparatus for manufacturing a finished part from a workpiece having a surface hardness includes multiple elements. The first element is a cutting tool adjacent the workpiece, the cutting tool adapted to shape the workpiece. The second element is a means for shaping the workpiece with the cutting tool. The third element is a means for increasing the surface hardness of the workpiece during shaping of the workpiece with the cutting tool. The fourth element is a means for manufacturing the finished part from the workpiece shaped with the cutting tool, wherein the finished part is manufactured from the workpiece without using at least one additional operation needed by at least one other apparatus for manufacturing a comparable finished part which the other apparatus shapes from a comparable workpiece having a comparable surface hardness without increasing the comparable surface hardness of the comparable workpiece during shaping of the comparable workpiece, said at least one additional operation being selected from a group consisting of grinding, polishing, honing, deburring, peening, tumbling, burnishing, deep rolling, soft annealing, soft machining, soft shaping, soft forming, and work part cleaning.

Another aspect of the invention is a nozzle for jetting an expanding jet of a cryogen to a surface of a workpiece. A first embodiment of the nozzle includes multiple elements. The first element is at least one inlet adapted to receive a flow of the cryogen. The second element is an upstream portion in fluid communication with the at least one inlet, the upstream portion adapted to receive at least a portion of the flow of the cryogen from the at least one inlet. The third element is a downstream portion in fluid communication with the upstream portion and adapted to receive at least a portion of the flow of the cryogen from the upstream portion. The fourth element is at least one outlet in fluid communication with the downstream portion and adapted to receive and transmit from the downstream portion at least a portion of the flow of the cryogen. The fifth element is a means for separating the cryogen at least partially into a condensed phase portion and a vapor portion within the downstream portion of the nozzle.

A second embodiment of the nozzle is similar to the first embodiment but includes an internal expansion chamber adapted to confine the expanding jet of the cryogen, wherein the nozzle is adapted to clamp a cutting tool having a tool rake surface.

There are several variations of the first embodiment of the invention. In one variation, the downstream portion of the nozzle has at least one diverging wall and at least one converging angle wall adapted to converge on the expanding jet of the cryogen. In a variant of this variation, the diverging wall has a diverging angle and the converging wall has a converging angle less than the diverging angle. In another variant, the diverging wall is open to an ambient atmosphere.

Another embodiment is a nozzle for jetting an expanding jet of a cryogen to a surface of the workpiece. This embodiment includes multiple elements. The first five elements of this embodiment are the same as the first five elements of the first embodiment of the nozzle. The sixth element is an internal expansion chamber adapted to confine the expanding jet of the cryogen, wherein the downstream portion of the nozzle has at least one diverging wall open to an ambient atmosphere and at least one converging wall adapted to converge on the expanding jet of the cryogen, and wherein the diverging wall has a diverging angle and the converging wall has a converging angle less than the diverging angle, and wherein the nozzle is adapted to clamp a cutting tool having a tool rake surface.

BRIEF DESCRIPTION OF THE DRAWINGS

The invention will be described by way of example with reference to the accompanying drawings, in which:

FIG. 1 (1A, 1B and 1C) shows the key parameters of cryogenic fluid impingement on a cutting tool and a workpiece surface: impingement angle (α), spread angle (β), tool feed rate (f), depth of cut (d), the radius of tool curvature in contact with work material (r), impingement area (A), and the distance between the center of the impingement area and the work part surface (L), and more specifically.

FIG. 2 (2A-2E) illustrates an apparatus and a method for impinging cryogenic fluid on a tool and work surface using free and confined-jet nozzles, and more specifically.

FIG. 5 (5A and 5B) illustrates two aspects of the present invention during finish-turning of prehardened bearing steel, 52100 grade, and more specifically.

DETAILED DESCRIPTION OF THE INVENTION

Figure 1C:
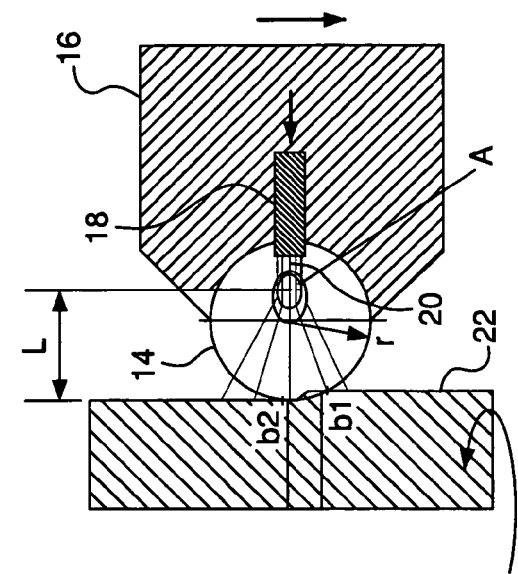
FIG. 1C is a schematic diagram illustrating a top view of an embodiment of the present invention wherein the cryogenic fluid jet forms an impingement spot A on the rake surface of a cutting tool at a distance L from the work surface of the workpiece.

The present invention includes a method and apparatus for improving surface finish, or reducing surface roughness, and improving surface integrity of a work material or increasing compressive residual surface stress by increasing the hardness of the work material. Although the present invention is discussed herein in the context of machining a work material with a cutting tool, persons skilled in the art will recognize that the invention has broader application and may be used in many other shaping and forming processes, including but not limited to other types of machining, rolling, bending, stamping, profiling, drawing, etc.

The work material can be hardened prior to machining and other shaping operations by a suitable heat treatment, chemical treatment, or mechanical treatment, including but not limited to transformation hardening, e.g. quench-tempering of martensitic steels, cryogenic quenching treatments as exemplified by J.Y. Huang et al. (*Microstructure of cryogenic treated M2 tool steel, Materials Science and Engineering, A339*, 2003, pp. 241-244), diffusion carburizing, nitriding, carbonitriding, baking, aging, laser glazing, welding arc (GTAW) solidification hardening, polymer cross-linking and ultra-violet light curing, work hardening via shot-peening or rolling, forging, cold extrusion and drawing, cold pressing, densification or coining, and combinations thereof, as well as other commonly used treatments selected for the type of work material. It should be understood that many of these work surface hardening operations can be carried out immediately before the inventive shaping step, e.g. immediately before the finish-cutting or forming tool contacting the work surface, in the same workpiece set-up, in the same manufacturing system, or in the same, automated transfer line. An example of hardening operations which can be easily adopted before the shaping tool are induction hardening and laser treatment of surface in the stream of gas containing carbon as taught by Kumar et al. (U.S. Pat. No. 6,454,877 B1).

The cryogenic cooling can be achieved by contacting the work material with a cryogen in a liquid, vapor, or solid phase. The preferred inert cryogenic liquids, which all boil at temperatures much below the freezing point of water at 1-atmosphere pressure, include liquid nitrogen, liquid argon, liquid carbon dioxide, and liquid helium. However, persons skilled in the art will recognize that other cryogenic mixtures of liquids, gases, and solid particles could be used as the cryogen.

The preferred cryogenic cooling method should be highly localized and produce a short-lived hardening effect. By jetting or spraying a cryogenic fluid there is no need to freeze the entire workpiece, which would be expensive and impractical. The hardening surface treatment technique of the present invention can be used when it is desired to have a final product harder than the feedstock used for machining, while the cryogenic cooling technique can be used if it is desired to retain the initial material hardness after machining. Also, the work material can be hardened prior to machining operations by surface treatment, as well as during machining operations by cryogenic cooling to maximize the surface finish and surface integrity of the machined part.

Another aspect of the present invention is an optimized method of jetting cryogenic fluid at a cutting tool, or another shaping or forming tool, and a workpiece surface, which method has been developed by trial and error to meet certain cooling and work material hardening requirements while simultaneously maximizing tool life, thereby increasing manufacturing productivity and reducing manufacturing costs, including the costs of coolant spent. Also, a new type of cryogenic nozzle for machining has been developed. Thus, the present invention includes a clean, cost-effective, accelerated-speed manufacturing method which improves surface finish and surface integrity of processed parts (even when the parts are hard) and allows users to skip multiple manufacturing steps.

Various observations and discoveries were made during Applicants' use of the present invention on finish turning of metallic, composite, and polymer work materials. Some of these observations and discoveries are discussed below.

An expansion of a compressed liquid nitrogen (LIN) coolant, or another liquid cryogenic coolant, into a 1-atmosphere pressure jet using a nozzle aimed at a tool rake surface results in a more effective tool cooling than contacting that tool rake surface with compressed LIN. While the exact cooling mechanism responsible for this effect is not clear, Applicants believe that it may be explained by the lower temperature of the decompressed liquid droplets impacting the tool. The normal temperature of LIN at 1-atmosphere is −320° F., while the temperature of LIN compressed to 120 psig is −275° F. (i.e., 45° F. higher). Applicants observed that the cooling of a tool is most effective when the tool surface is impacted by a fast moving jet or spray of LIN at a pressure no higher than 1-atmosphere.

Figure 1B:
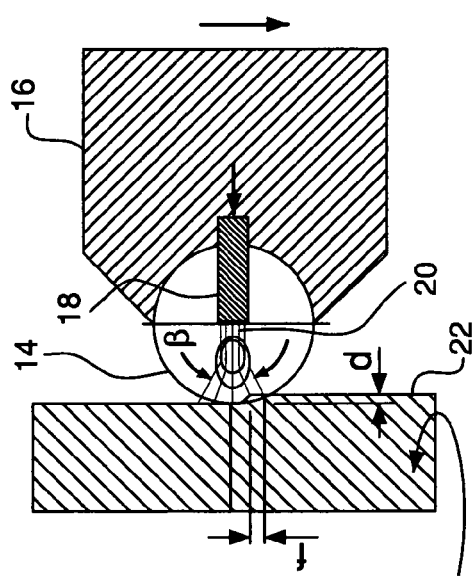
FIG. 1B is a schematic diagram illustrating a top view of one embodiment of the present invention wherein the cryogenic fluid jet splashes on a tool surface and then impinges on the surface of the workpiece at a spread angle (β)
Figure 1A:
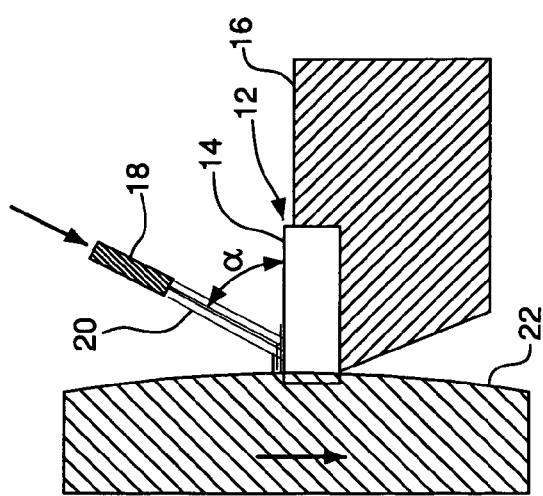
FIG. 1A is a schematic diagram illustrating a side view of one embodiment of the present invention wherein the cryogenic fluid jet impinges on a tool rake surface at an impingement angle (α)

FIG. 1A shows a side view of one embodiment of the present invention wherein a fast moving cryogenic fluid jet 20 impinges on a tool rake surface 14 at 1-atmosphere pressure. The components include a cutting tool 12 (or cutting insert), the tool rake surface 14, a toolholder 16, a tubular nozzle 18 issuing the jet 20, and a workpiece 22. Although cooling of the tool rake surface 14 is the most preferred method, cooling of other tool surfaces, such as the major and minor or trailing flanks, also is within the scope of the present invention.

The tool rake surface 14 is the surface of the cutting tool 12 (or cutting insert) which extends behind the cutting edge and stays in contact with a material chip sheared away from the workpiece 22. (Rake surface is the cutting tool surface adjacent the cutting edge which directs the flow of the chip away from the workpiece. The rake surface may be completely flat, chamfered, or may have a more complex, three-dimensional topography produced by the molding or an addition of a plate in order to provide an enhanced control chip flow and/or chip breaking.)

As used herein, the terms "cutting tool" and "cutting insert" are interchangeable. A cutting insert is an indexable, replaceable cutting tool made of a hard material, e.g. WC—Co, CBN, $Al_2O_3$, or $Si_3N_4$, having a cutting edge and a rake surface, and mounted on a suitable toolholder.

FIGS. 1B and 1C illustrate certain features of the embodiment shown in FIG. 1A, which features are discussed below. The arrows in FIGS. 1A-1C show the directions of rotation of the workpiece 22, the tool depth of cut (d), feedrate (f), and the supply of a cryogenic fluid into the nozzle 18.

FIG. 1C shows the spray impact area designated as A. An increase of the spray impact area (A) on the tool rake surface 14 results in improved cooling of the cutting tool 12. However, increasing the distance between the rake surface and the exit of the nozzle 18 to increase the spray impact area reduces cooling efficiency if the jet 20 travels through air. Applicants believe that, in addition to the drop in the mass-flux density or impact density, the observed effect results from the entrainment of air into the expanding jet and an excessive in-flight boiling of cryogenic droplets.

An increase in the jet impingement angle (α) located in the plane normal to the tool rake surface 14 from 0° (the tangential direction) to 90° (the normal direction) results in significantly improved cooling of the cutting tool 12 and, consequently, a longer tool life or the capability of cutting faster and/or cutting harder work parts which generate more heat. FIG. 1A shows an impingement angle (α) against the background of the cutting tool 12, toolholder 16, workpiece 22, and a tubular jetting nozzle 18. A large impingement angle (α) is necessary for an effective cutting of a hard or hardened workpiece, and the effect of the angle is proportional to the hardness of the workpiece.

An increase in the jet spread angle (β) located in the plane of the tool rake surface 14 reduces work surface roughness. FIGS. 1B and 1C illustrate the jet spread angle (β) against the background of a round cutting tool 12, toolholder 16, workpiece 22, and a tubular jetting nozzle 18. The distance L between the impingement spot or spray impact area A on the tool rake surface and the work surface shown in FIG. 1C is not critical since the splashed jet entrains less air than a free jet discussed above. What is critical is that the spread angle (β) is sufficient for the splashed jet to reach at least the entire length of contact between the cutting tool and the workpiece. The contact length extends between points b1 and b2 as shown in FIG. 1C. In the case of rounded tools or tools cutting on the curvature of a rounded corner, which is frequently encountered in finishing operations, the contact length b1-b2 can be calculated from the depth of cut (d), tool radius (r), and tool feedrate (f) shown in FIGS. 1B and 1C using the following equation:

$$\overline{b1b2} = \frac{\pi r}{180}\left(a\cos\frac{r-d}{r} + a\cos\frac{\sqrt{4r^2-f^2}}{2r}\right)$$

Without wishing to be bound by any particular theory, Applicants believe that the surprising, desired effect of a sufficiently large spread angle (β) on work surface finish is apparently related to the chilling and hardening of the work surface, the chilling and hardening of the thin, trailing end of the work material chip, and preserving the original geometry of the trailing edge of the cutting tool, which controls the surface finish but wears faster without an efficient, cryogenic cooling.

The degree of work surface finish improvement resulting from increasing the spread angle (β) is inversely proportional to the initial hardness of the work material. This is in contrast to the effect of the impingement angle (α) on tool life which is directly proportional to the initial hardness of the work material. Understandably, differently shaped tools (e.g., polygonal tools) also can be used in machining operations according to the present invention and form the desired values of impingement angle (α) and spread angle (β).

A more or less precise control of the impingement angle (α) and the spread angle (β) is practical only if an expanding, cryogenic fluid jet is at least partly confined above the targeted rake surface. This is because a free-expanding, unconstrained cryogenic jet discharged from a simple, unconfined nozzle, e.g., a tubular and/or converging, or even from a much more precisely jetting, converging-diverging, nozzle with a round or polygonal cross-section, tends to broaden radially or "bush-out" on decompression from an elevated supply pressure to atmospheric pressure. The extent of the radial bushing is strongly dependant on the temperature and phase composition (vapor phase content) of the cryogenic stream entering the nozzle. Since the temperature and phase composition of a cryogenic stream are subject to difficult to avoid fluctuations, it is beneficial to use a nozzle in which the expanding jet is at least partially confined. Such an improved nozzle should also maximize the surface contact area or spray impact area (A)

between the boiling cryogenic fluid and the tool rake surface and prevent pressure build-up over that boiling area, i.e., maintain an essentially 1-atmosphere pressure.

FIGS. 2B-2E show an embodiment of the present invention using a confined jet nozzle 32. To prevent radial bushing of a cryogenic fluid jet and entrainment of warm, ambient air (typical for free-expanding jets produced by simple nozzles, such as in FIG. 2A), the nozzle 32 of the present invention (shown in FIGS. 2B-2E) expands the cryogenic fluid from an elevated supply pressure to an atmospheric pressure inside a dome 30 that is located just above the tool rake surface 14.

Figure 2A:
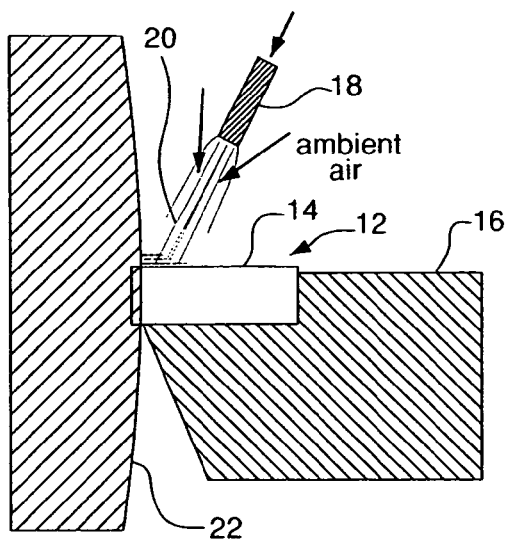
FIG. 2A is a schematic diagram illustrating a side view of an embodiment of the present invention using a free-expanding cryogenic fluid jet entraining an ambient atmosphere, such as air.
Figure 2C:
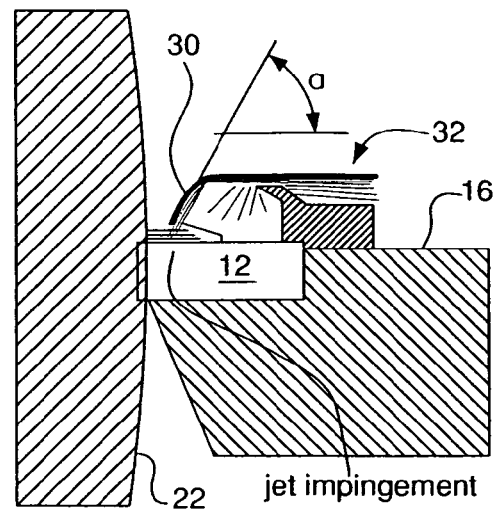
FIG. 2C is a schematic diagram illustrating a side view of an embodiment of the present invention using a dome-shaped, confined-jet nozzle of the present invention shown in cross-section, located above the rake surface wherein the cryogenic fluid jet impinges the rake surface at an impingement angle (α)
Figure 2B:
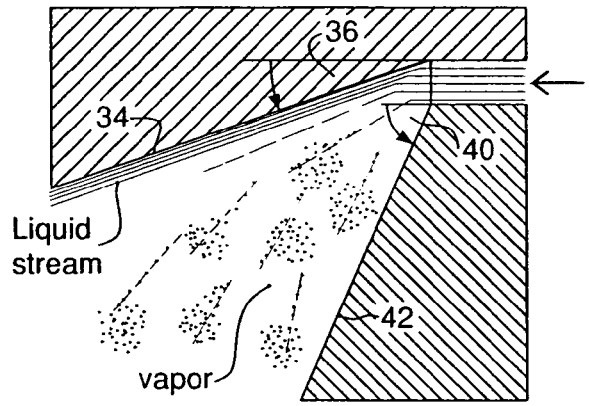
FIG. 2B is a schematic diagram illustrating a side view of the downstream part of the nozzle in the embodiment of the present invention illustrated in FIG. 2C.

FIG. 2B illustrates the principle of fluid jet confinement. During the expansion and decompression inside the downstream part of the nozzle 32, the cryogenic jet separates into a vapor portion and a condensed phase portion, which typically is a liquid stream, as shown in FIG. 2B. In some cases, the condensed phase portion may comprise fine ice particles or a cryogenic slush, such as in the case of expanding cold carbon dioxide ($CO_2$) gas or liquid. Due to higher density and inertia, the condensed phase portion tries to continue expanding along the original axis but is deflected and continues expansion along the converging wall 34. The converging angle 36 of the converging wall, as shown in FIG. 2B relative to the original axis, must be less than the diverging angle 40 of the diverging wall 42 to assure the desired fluid decompression and jet expansion.

Typically, the initial angle of the converging wall 34 may vary between 0° and 60°, but the curvature of the converging wall can increase at some distance downstream, and the final converging angle 36 of the converging wall relative to the original axis can be as large as 90°. It is this final converging angle of the converging wall which determines the jet impingement angle alpha ($\alpha$) and the tool cooling effect. The steeper it is the better.

Typically, the diverging angle 40 can vary from 30° to 175° relative to the original axis, depending on other nozzle design considerations, with the limiting condition that the diverging angle is always larger than the converging angle 36. The net result of so selected wall angles is the capability of separating the vapor portion from the condensed phase portion (e.g., liquid), and expanding the condensed phase portion in the desired direction and under the desired angle. The result is quite important because the separated condensed phase portion (e.g., liquid) is significantly more effective in cooling than is the vapor portion.

FIG. 2C illustrates the operation of the confining nozzle 32 designed according to the principle described above and points out the expansion of the cryogen from an elevated supply pressure to atmospheric (1 atm.) pressure inside a dome 30 or cavity of the nozzle which is located just above the tool rake surface 14. The gap between the bottom edge of the dome and the rake surface is sufficient to prevent undesired pressure build-up inside the dome. The front side of the bottom edge of the dome, which faces the workpiece 22, can be carved or grooved in order to project the main portion of the cryogen in the most desired direction. The shape and size of the front groove or grooves can be selected to obtain the desired value of the spread angle ($\beta$). The height and the internal curvature of the dome can be selected to produce the desired jet impingement angle ($\alpha$). Furthermore, the spray impact area or contact area (A) can be conveniently maximized by enlarging the size of the base of the dome.

When jetting a liquid-based cryogenic stream, the expansion of compressed cryogen inside the dome 30 produces a substantially colder liquid and vapor phase. Due to a significantly higher density, the liquid phase continues to expand in the original direction dictated by the orientation of the constricting orifice located upstream and becomes deflected on the internal wall of the dome. Consequently, the liquid phase impinges on the tool rake surface 14 under the same angle as that of the line tangential to the curvature of the dome. Thus, the impingement angle ($\alpha$) can be easily set by the curvature and the elevation of the dome, and making the impingement angle ($\alpha$) steeper than, say, 30° or even 80°, therefore is not difficult.

While the liquid portion of the cryogenic fluid expands over the internal curvature of the dome 30 and leaves the dome through the front groove, the vapor (which is much less dense than the liquid) is pushed back toward the tool rake surface 14 and the gap between the bottom of the dome and the rake. The nozzle 32 of the present invention is, in essence, a centrifugally phase-separating device which projects the most cooling, liquid phase toward the hottest part of the cutting tool, and removes the cold vapor through the sides of the base of the dome.

Figure 2D:
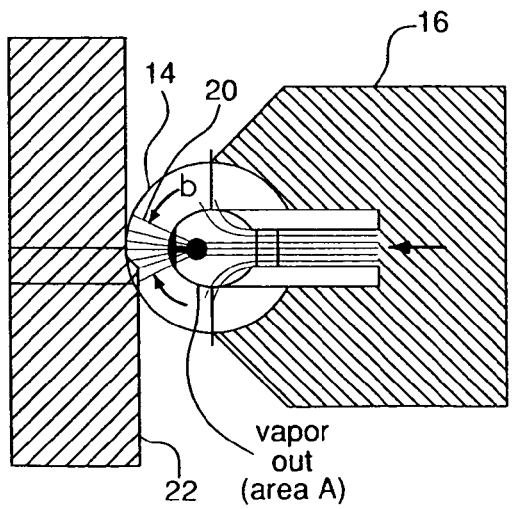
FIG. 2D is a schematic diagram illustrating a top view of an embodiment of the present invention using a rounded, dome-shaped, confined-jet nozzle of the present invention, shown in cross-section, located above the rake surface wherein the cryogenic fluid jet impinges on the surface of the workpiece at a spread angle (β)
Figure 2E:
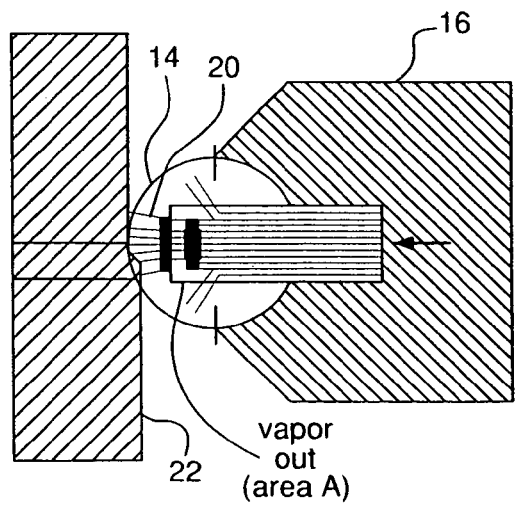
FIG. 2E is a schematic diagram illustrating a top view of an embodiment of the present invention using a rectangular, dome-shaped, confined-jet nozzle of the present invention, shown in cross-section, located above the rake surface wherein the cryogenic fluid contacts the rake surface over an impingement area A.

FIGS. 2D and 2E show a top view of two possible configurations of the nozzle 32 of the present invention where the front part of the dome 30 can be terminated either with a spherical curvature or a flat-curved wall to produce a more or less constricted stream of liquid cryogenic fluid. Corresponding to the shape of the front part of the dome can be the shape of the constricting orifice located upstream—round for a spherically curved dome and slit-shaped for a flat-wall curved dome.

The nozzle 32 of the present invention fits well into a real lathe-machining environment, where chips evolving from a machined work surface tend to entangle around, collide with, or jam in front of conventional coolant nozzles. The compact design of the nozzle allows for mounting it at the end of conventional clamps holding down cutting inserts or attaching a holding bolt to the back end of the nozzle, so that it becomes an insert clamp and a coolant nozzle at the same time.

Applicants observed that an increase in work material hardness reduces the as-machined roughness of a work surface during the useful life of a cutting tool, which is desired, but tends to shorten the useful life of the cutting tool, which is undesired. Surface roughness is the most popular measure of surface finish, and it is desired to maximize surface finish or minimize roughness in finishing operations. When the surface roughness in turning is reduced to the low values typical for grinding operations, it is possible to skip the grinding step and shorten the entire manufacturing process, thereby generating substantial savings. The challenge facing the manufacturing industry is to improve surface finish without reducing cutting tool life, as reduced cutting tool life leads to increased production costs and poor production rates. If the cryogenic fluid impingement angle ($\alpha$) is steep enough, the problem of short tool life during cutting hard work materials is reduced.

Work surface hardening that enhances surface finish (i.e., reduces roughness) and surface integrity (i.e., increases compressive stresses) can be permanent or temporary, lasting only as long as the material surface is cold and effective only during machining operations. A permanent prehardening of work surface can include heat-treatment, diffusion carburizing, nitriding, polymer cross-linking, etc. As Applicants observed, the same work material produces better surface finish if it is hardened by a permanent treatment before machining. This is an alternative way of improving surface finish that does not involve increasing the spread angle ($\beta$).

However, the combination of prehardening work material and an additional hardening of it during machining using cryogen sprayed under a sufficiently large spread angle ($\beta$) often results in further improvements of surface finish. Applicants observed that if the cryogenic chilling is used on an already prehardened work material (e.g., steel hardened by quenching and tempering or carburizing), the as-machined surface roughness drops right to the limit of the conventionally calculated theoretical roughness (Ra-t), and if the geometry of the trailing edge of the cutting tool is correct, the as-machined surface roughness drops even below the conventional limit (Ra-t).

The ideal arithmetic average surface roughness (AA) in turning or the conventional Ra-t limit is usually calculated from tool feedrate (f) and tool nose radius (r) as follows:

$$R_{a-t} = \frac{f^2}{32r}$$

from C. Feng, *An Experimental Study of the Impact of Turning Parameters on Surface Roughness*, Paper No. 2036, Proceedings of the 2001 Industrial Engineering Research Conference of the Institute of Industrial Engineers (2001).

Although widely accepted, this calculation is only approximate, because tool geometry and feedrate of a turning tool allow only for exact calculation of the maximum peak-to-valley roughness (Rt) and the ratio of Rt/Ra-t=m is simply an estimate for typical turning conditions. Even though Applicants' experimental work in finish-turning shows that the ratio (m) may vary from 3.6 to 7.8 (per C. Feng), Applicants use herein the expression for Ra-t and m=4 as the normative limit for the ideal arithmetic average surface roughness (AA) in turning.

$$R_t = \frac{f^2}{8r} \text{ and } R_{a-t} = R_t/m$$

The observations and discoveries made during Applicants' work on finish turning of metallic, composite, and polymer work materials can be integrated in the five qualitative equations below, in which: $R_a$—arithmetic average surface roughness of machined surface, H—hardness of work material during cutting operation, t—life of cutting tool, α—nozzle-controlled cryogenic jet impingement angle, A—nozzle-controlled area of tool rake surface that is impacted by boiling cryogenic fluid, $H_o$—initial hardness of work material, $\Delta H_p$—an increase in work material hardness as a result of optional prehardening step, β—nozzle-controlled cryogenic jet spread angle, f—tool feedrate during cutting, r—tool nose radius, $R_{a-t}$—theoretical roughness limit for round cutting edge, n and m—constants greater than zero which can be determined from machining tests on specimens, and the sign "~" denotes proportionality.

$$R_a \sim \frac{f^2}{mrH} \text{ and } t \sim \frac{\alpha}{H} \cdot A \text{ and}$$

$$H \sim H_o + \Delta H_p + n \cdot \frac{\beta}{H_o + \Delta H_p},$$

hence, $$R_a \sim \frac{f^2}{m \cdot r \cdot \left(H_o + \Delta H_p + n \cdot \frac{\beta}{H_o + \Delta H_p}\right)} \text{ and}$$

$$t \sim \frac{\alpha \cdot A}{H_o + \Delta H_p + n \cdot \frac{\beta}{H_o + \Delta H_p}}$$

EXAMPLE 1

The effect of the cryogenic jet impingement angle (α) on cooling of a cutting insert was evaluated for various flowrates and supply pressures. Liquid nitrogen (LIN) coolant was jetted using two simple, tubular nozzles such as that shown in FIG. 2A. The internal termination of the nozzles was shaped to form a converging-diverging (CD), Laval-type fluidic passage which can focus expanding cryogenic jets more precisely than straight-wall or converging-only fluid passages. The narrowest section of the throat of the first CD nozzle was 0.019 inches in diameter, and the second CD nozzle was 0.025 inches in diameter. At the supply pressure of 120 psig, the smaller nozzle jetted 1.1 lbs/minute of LIN, and the larger nozzle jetted 1.8 lbs/minute of LIN. An additional test with the larger nozzle at the reduced supply pressure of 60 psig showed that the expanding jet was more confined or less bushy, and its flowrate was 1.2 lbs/minute of LIN.

Figure 3:
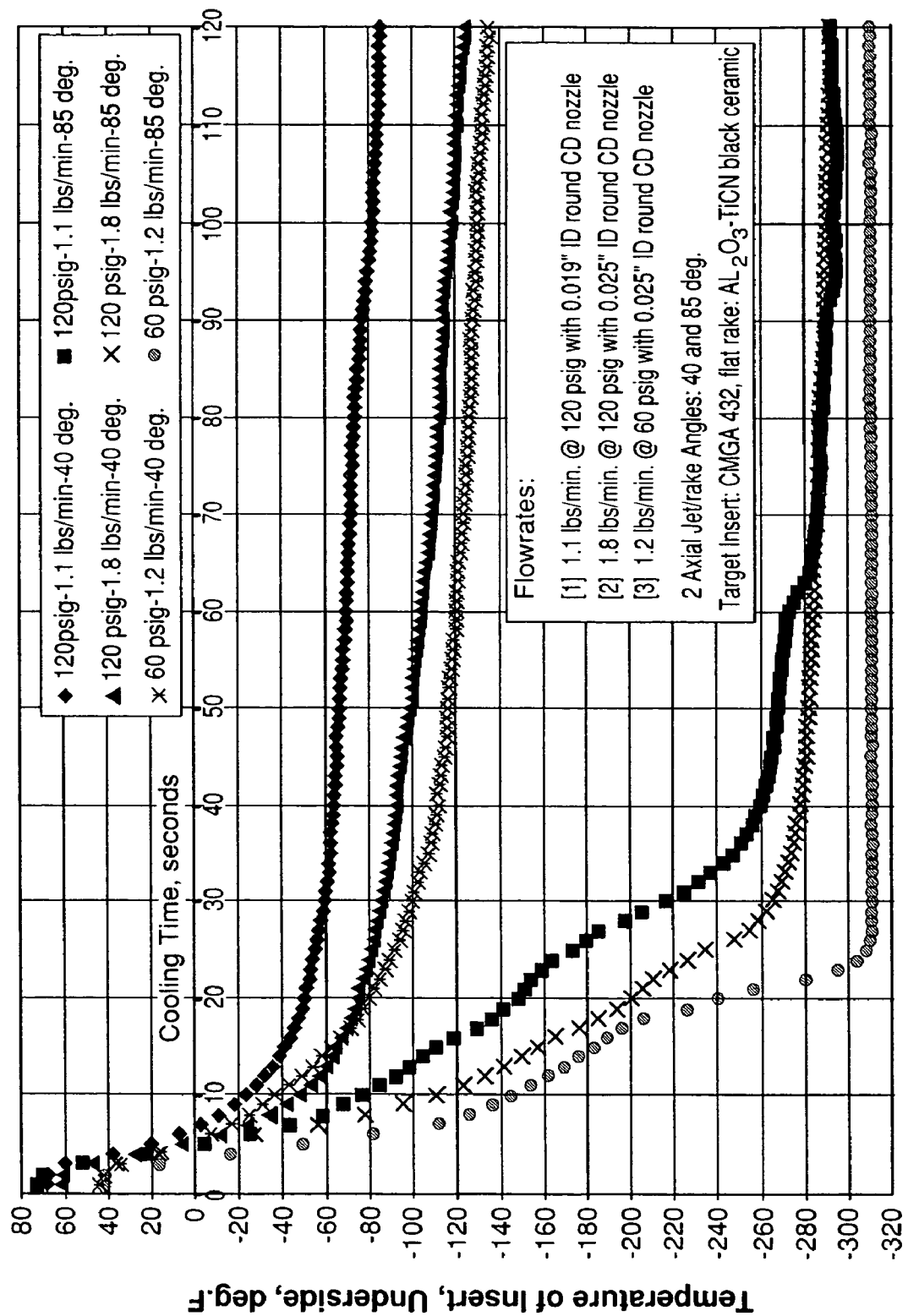
FIG. 3 is a graph showing the effect of impingement angle (α), supply pressure, and flowrate of a cryogenic fluid on cooling rate of a cutting insert tool.

LIN jets produced by each nozzle were aimed at the rake of a cutting insert typically used in finishing operations: CNGA/CNMG-432 (ISO) made of a relatively non-conductive $Al_2O_3$—TiCN ceramic composite material. The axial distance between the exit of each nozzle and the rake surface was kept constant at 0.5 inches. Two impingement angles (α) were evaluated for each jetting condition: 40° and 85°. A microthermocouple was placed right under the insert, under its cutting nose, to monitor temperature changes during the first two minutes of LIN jetting from room temperature. The test results graphed in FIG. 3 show that a steep jet impingement angle (α=85°) is the most critical factor for a rapid and effective cooling of the cutting insert. The effect of jet bushing during expansion is less important but not neglectable—the more confined, 60-psig jets were more effective than the 120-psig jets. Most surprisingly, the effect of LIN flowrate was found to be the least important of the three factors, indicating that the most cost-effective cryogenic fluid jet cooling method must optimize the impingement angle (α) and its confinement rather than simply maximize flowrates.

The test was repeated with another popular cutting insert used in finish turning operations: CNGA/CNMG-432 made of a thermally conductive cubic boron nitride (CBN) cutting nose brazed into a conductive WC—Co carbide holder. At the steep jet impingement angle (α=85°), cooling rates were found to be the same as for the non-conductive ceramic insert; the CBN/WC—Co cooling rate was only somewhat higher than before, and only at the lower impingement angle (α=40°). Thus, the control of the jet impingement angle (α) was again found to be critical for cooling of the nose of the cutting tool, necessary for an effective and fast cutting of hard work materials.

EXAMPLE 2

Iron, graphite, copper, and nickel powders were premixed to obtain the FN-0208 (MPIF class) composition (0.8-0.9% C, 0.8% Ni, 2.0% Cu, bal.Fe, all on weight basis), pressed into powder metallurgy (P/M) disks, and sintered to achieve two different density levels: 6.67 g/cm³ (6.67 Mg/m³), 'low-density' material, 14.5% porosity fraction, and 7.20 g/cm³ (7.20

Mg/m³), 'high-density' material, 7.7% porosity fraction. Half of the disks from each density group were subsequently case hardened by heat-treating using the conventional procedures for achieving a high-level apparent hardness—at least 30 HRC in the case of the low density material, and at least 40 HRC in the case of the high density material.

Surface machining of so prepared P/M disks was carried out on a 20 kW CNC lathe, constant speed operation, using the following parameters: (1) cutting speed—1,000 ft/min. (305 m/min. or 5.08 m/s); (2) feedrate—0.007 inch/rev. (0.178 mm/rev.); and (3) depth of cut—0.008 inches (0.203 mm). A "low-content", commercially available, uncoated PCBN cutting insert was used, grade BN250 with 2 cutting edges (popular, brazed tip type). Insert and edge geometry were as follows: CNMA-433, 0.005-inch land width (0.127 mm wide chamfer), −20° chamfer angle. The insert was mounted in the most commonly used type of steel toolholders characterized by −5° rake and −5° inclination angles. The most conventional method of cutting fluid cooling was used during machining which involved flooding the insert and the P/M disks. The fluid used, a 9 vol % of emulsified oil in water, was flooded toward the insert via tubing from a 20 psig (1.38 bar) supply pressure.

Surface finish of the machined P/M disks was evaluated using an arithmetic, Ra-roughness meter, Surtonic 10, available from Taylor Hobson, Ltd. Material hardness was measured on a Vickers scale (kG/mm²) using conventional and microhardness testers. The results are set forth in Table 1 below. The reduction of surface roughness (i.e., improvement of surface finish with increasing hardness) is clearly evident and shows that a thermo-mechanical surface hardening prior to machining is an effective measure for superfinishing.

TABLE 1

| P/M material condition: | Apparent hardness, HV | True (particle) hardness, HV | Roughness, Ra in microinches |
|---|---|---|---|
| As-sintered/soft disk, low-density | 99 | 186 | 44 |
| As-sintered/soft disk, high-density | 127 | 189 | 43 |
| Heat-treated/hardened disk, low-density | 306 | 567 | 11 |
| Heat-treated/hardened disk, high-density | 399 | 569 | 8 |

EXAMPLE 3

The as-sintered, soft P/M disks from Example 2 were surface machined using liquid nitrogen (LIN) cryogenic jet cooling and a tool-clamping nozzle with an internal expansion chamber as shown in FIGS. 2C and 2D. At the LIN mass-flowrate of 1.8 lbs/minute, and the supply pressure of 100 psig (6.89 bar), the nozzle produced a jet imprinting at the rake surface under the impingement angle (α) equal 45° and spreading to the sides under the spread angle (β) equal 90°. A cost-effective, commercially available, $Al_2O_3$—TiC based, TiN-coated (PVD), fine-grained black ceramic cutting insert was used which had four (4) cutting edges and geometry specified as follows: CNGA-433, 0.008-inch land (0.200 mm wide chamfer), −25° chamfer angle. Apart from the different insert and cooling method, all other conditions were the same as in Example 2.

Table 2 compares the as-machined surface roughness of flood and LIN machined disks and the life of cutting edge before an average tool flank wear ($V_{b-ave}$) reaches the value of 0.30 mm. It is clear that LIN cooling and hardening of the work material and of the cutting tool results in a substantial improvement of surface finish as well as tool life.

Figure 4:
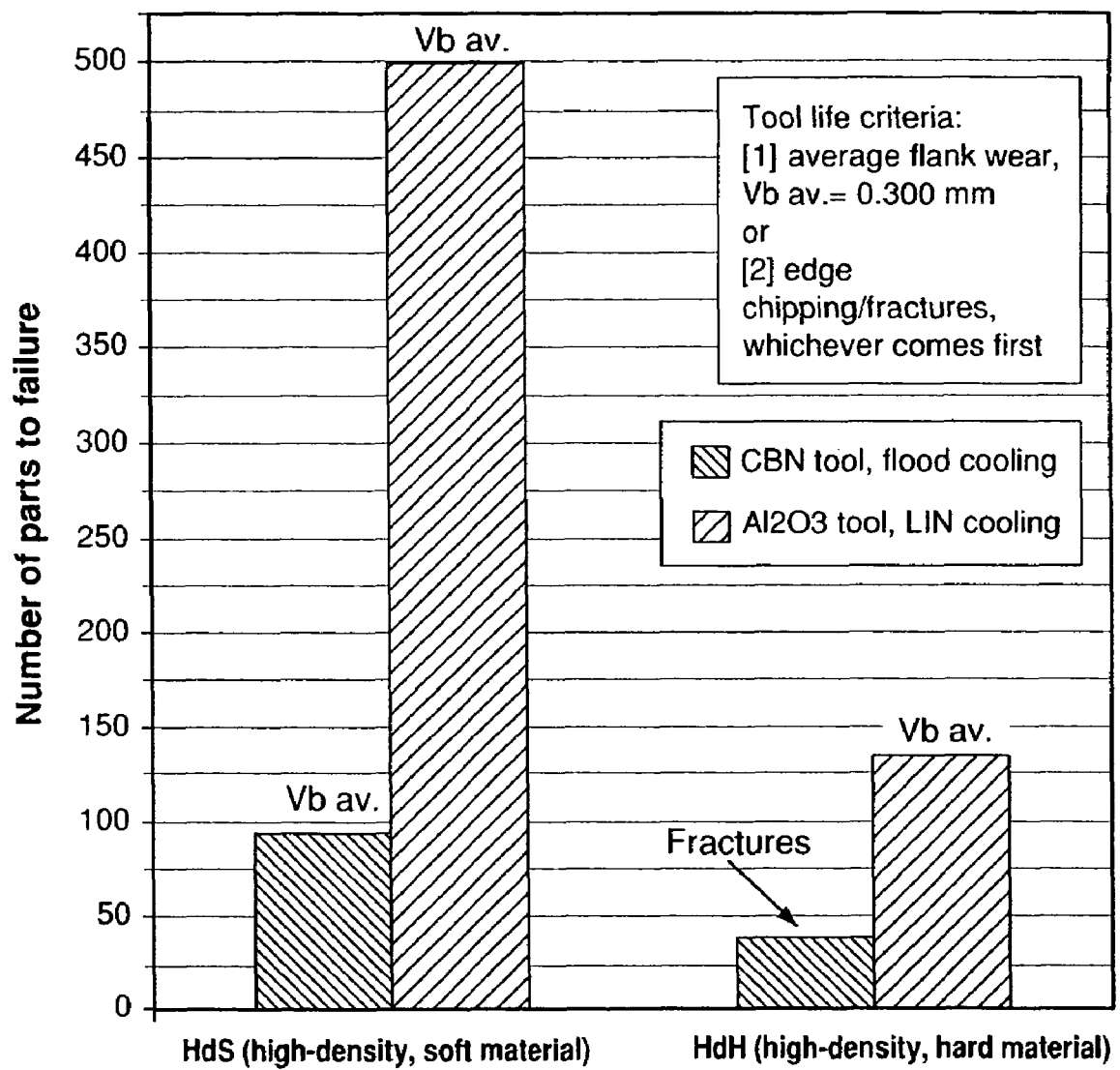
FIG. 4 is a graph showing the effect of cooling method on the life of a tool cutting an as-sintered and prehardened ferrous powder metallurgy workpiece.

FIG. 4 compares the life of tools engaged in cutting of soft and prehardened parts. The life of tools is generally shorter as the material hardness increases, but the life of the LIN-cooled tools during machining of the hard parts is still longer than the life of the conventionally, flood-cooled tools during machining of the soft parts. Thus, it is cost-effective to completely skip the soft machining steps from the manufacturing process, then harden the work surface, and perform the finish turning using LIN cooling.

TABLE 2

| P/M material condition: | Cooling method | Roughness, Ra in microinches | Cutting edge life in number of P/M disks cut |
|---|---|---|---|
| As-sintered/soft disk, low-density | Flood | 44 | 92 |
| As-sintered/soft disk, low-density | LIN | 24 | 337 |
| As-sintered/soft disk, high-density | Flood | 43 | 94 |
| As-sintered/soft disk, high-density | LIN | 23 | 499 |

EXAMPLE 4

The effect of cryogenic jet spread angle (β) on surface finish was evaluated as a function of work material hardness and plasticity. A medical cobalt-chromium alloy, ASTM F-type (Co—Cr—Mo—Ni—Fe—Si—W—Al—Ti), with the average hardness of 44 HRC was selected for tests as a mid-hardness, somewhat gummy-machining material. A popular bearing steel, 52100 (1% C-1.5% Cr-0.35% Mn-0.20% Si-Bal.Fe), was heat-treated by quenching and low-temperature tempering for the hardness of 60 HRC in order to represent the group of hard work materials. Both materials were cut using a 20 kW CNC lathe, constant speed operation, and the same type of commercially available cutting insert and toolholder: an inexpensive, commercially available, $Al_2O_3$—TiC based, TiN-coated (PVD), fine-grained black ceramic insert CNGA-432, 0.004-inch chamfer, −20° chamfer angle, and a −5° rake/−5° inclination angle toolholder. The machining parameters were different for each work material, as shown in Table 3.

Two types of tool-clamping/internal expansion chamber nozzles were used during machining of the two work materials: the first, shown in FIG. 2D, with a spread angle (β) of 90° and the second, shown in FIG. 2E, with a spread angle (β) of 25°. The jet impingement angle (α) was the same for both nozzles and equaled 45°. Each nozzle was supplied with LIN at the pressure of 100 psig, and each was spraying 1.8 lbs of LIN per minute.

As in the previous Examples, surface finish of machined parts was examined using an average arithmetic, Ra-roughness meter, Surtonic 10, available from Taylor Hobson, Ltd. Resultant work surface roughness, Ra, known also as AA or CLA roughness, was compared to the theoretical surface roughness limit, Ra-t, estimated from the following normative equation: Ra-t=$f^2/(8\ m\ r)$, where: f—tool feedrate, r—tool nose radius, and m—roughness conversion constant assumed to be 3.9 for the present surface-finish cutting operations. The results in Table 3 below show that: (1) a large cryogenic jet spread angle β improves work surface finish, but its effect is inversely proportional to work material hardness; (2) harder and/or prehardened work materials produce a better surface finish, 1/Ra, when the finish is estimated using the theoretical roughness limit, Ra-t; and (3) the combination of prehardened work material and the hardening effect of cryogenic coolant applied during cutting can produce work surface roughness levels which are below the conventionally accepted, theoretical roughness limit, Ra-t.

TABLE 3

| Work material | Co—Cr alloy | | 52100 bearing steel | |
|---|---|---|---|---|
| Surface hardness | 44 HRC | | 60 HRC | |
| Cutting speed | 900 ft/min | | 650 ft/min | |
| Feedrate | 0.002 inch/rev. | | 0.004 inch/rev. | |
| Depth of cut | 0.005 inches | | 0.008 inches | |
| Theoretical roughness limit, Ra-t | 4.1 microinches | | 16.4 microinches | |
| Spread angle β of cryogenic nozzle used | 90° | 25° | 90° | 25° |
| Roughness measured, Ra, microinches | 7.6 | 12.0 | 8.0 | 8.3 |
| Roughness measured, Ra, as a percent of the theoretical roughness limit, Ra-t | 185% | 293% | 49% | 51% |

The low roughness levels shown in Table 3 and produced using LIN-hardening, as well as thermal prehardening combined with LIN-hardening during turning operations, can be fully appreciated when compared to the industrial standard roughness levels set forth in Table 4 below. Thus, Applicants' cutting method improves work surface finish to the point at which the conventional grinding and lapping operations may be eliminated and the costs of producing fine-finish parts are greatly reduced.

TABLE 4

Classification of machined surface finishes (ASM Handbook Desk Edition, 2001)

| Class | Roughness, R Mm | μin | Typical method of producing finish | Approximate relative cost to produce |
|---|---|---|---|---|
| Super finish | 0.10 | 4 | Ground, microhoned, lapped | 40 |
| Polish | 0.20 | 8 | Ground, honed, lapped | 35 |
| Ground | 0.40 | 16 | Ground, lapped | 25 |
| Smooth | 0.80 | 32 | Ground, milled | 18 |
| Fine | 1.60 | 63 | Milled, ground, reamed, broached | 13 |
| Semifine | 3.2 | 125 | Ground, broached, milled, turned | 9 |
| Medium | 6.3 | 250 | Shaped, milled, turned | 6 |
| Semirough | 12.5 | 500 | Milled, turned | 4 |
| Rough | 25 | 1000 | Turned | 2 |
| Cleanup | 50 | 2000 | Turned | 1 |

EXAMPLE 5

Figure 5B:
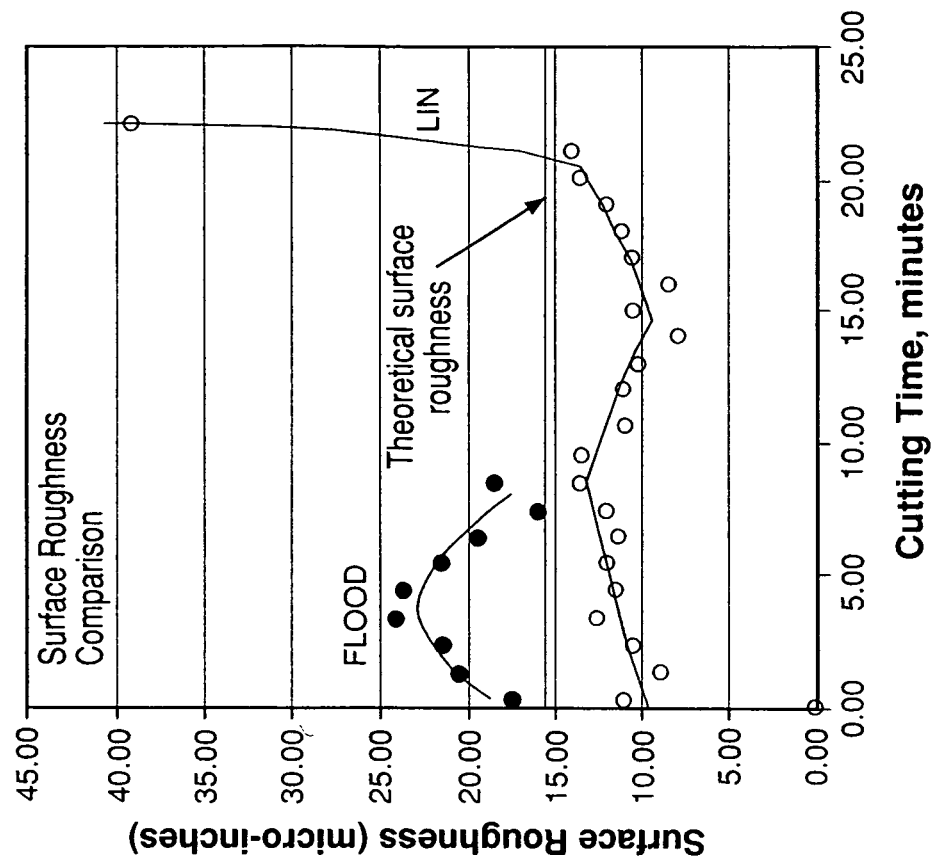
FIG. 5B is a graph showing the roughness of work surface throughout the life of the tool.
Figure 5A:
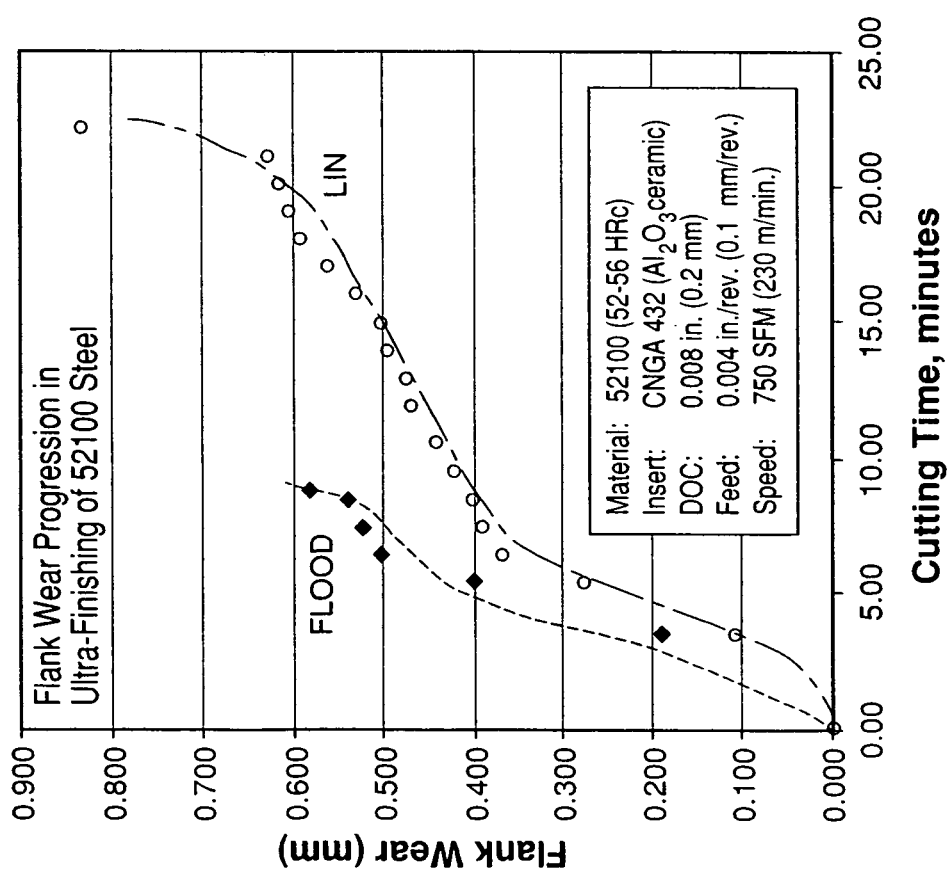
FIG. 5A is a graph showing the effect of cooling method on tool wear.

The effect of tool wear and cooling method on surface finish was evaluated as shown in FIG. 5. The work material was the same 52100 bearing steel as in Example 3 but tempered at higher temperature to reduce average surface hardness to 54 HRC. Cutting speed was increased from 650 ft/minute to 750 ft/minute, but the feedrate, depth of cut, theoretical roughness limit (Ra-t), the tooling, and the LIN supply method were the same as used on the 52100 material in Example 4. LIN jet impingement angle (α) and spread angle (β) were 45° and 25°, respectively. The comparative flood machining run used the flooding method as in Example 2. Results show that the surface roughness of the LIN machined material is lower than in the case of flood cooling, even though the flank wear of the LIN cooled tool is less than the flank wear of the flooded tool. The intensity of insert cooling by LIN preserves the cutting edge, and a low-angle spread of LIN is sufficient for improving surface finish of the hard work material. Moreover, the actual roughness with LIN falls below the theoretical limit, Ra-t. FIGS. 5A and 5B show that flank wear or tool nose flattening alone cannot explain the low roughness effect with LIN. Table 5 compares the surface finish of the harder steels (see Example 4) and the softer steels (see FIG. 5B) machined with LIN jetting under the same impingement angle (α) and spread angle (β). The harder 52100 surface, machined at a somewhat lower cutting speed, is smoother than the other one, indicating differences in the micro-plastic flow work material and chip around the cutting edge. This is additional proof that LIN jet-cooling during cutting, as well as work surface prehardening, are effective means of controlling surface roughness.

TABLE 5

| Work surface hardness | 60 HRC | 54 HRC |
|---|---|---|
| Cutting speed | 650 ft/min | 750 ft/min |
| Roughness measured, Ra, microinches | 8.3 | 11 |
| Roughness measured, Ra, as a percent of theoretical roughness limit, Ra-t | 51% | 67% |

EXAMPLE 6

Samples of 25 vol % glass filled nylon composite, as well as samples of plain polymers made of polypropylene, high-density polyethylene (HDPE), cast acrylic, and an acetal homopolymer Delrin® were prepared for finish end-milling and through-hole drilling tests using the LIN surface hardening method of the present invention. (Delrin® is a registered trademark of E.I. Du Pont De Nemours and Company.) LIN jet was impinged at and around the tool-work surface contact zone under a steep impingement angle (α) of 75° from the distance of 0.5 inches using a simple, but precisely jetting, tubular nozzle terminated with a CD orifice. In the case of through-hole drilling, a second jet of LIN was impinged at the work material surface on the exit side of a drill bit. Results showed that the LIN-hardening significantly reduced stringy burrs typically forming on the surface of these polymers during machining. Exit-side burrs were also eliminated in the case of through-hole drilling by minimizing the plastic ruptures of the material in front of the drill chisel approaching the exit wall. The overall machined surface improvement was especially significant when compared to the conventional, dry machining procedure. The observed improvement enables machining operators to skip the subsequent deburring step and eliminate the need for the conventional, lubricating flood cooling which contaminates the surface of polymeric parts and necessitates additional cleaning steps.

EXAMPLE 7

The effect of cryogenic cooling on work surface integrity and, most specifically, on residual stress distribution was evaluated during outer diameter, finish hard turning of alloy steel rings. The rings were made of M50 grade steel (0.85% C-4.1% Cr4.2% Mo-1% V-Bal. Fe, wt. basis) quenched and tempered to the hardness of 63 HRC. The lathe and toolholder used were the same as in Examples 2-5. One tool feedrate of 0.003 inches/revolution was used throughout all testing runs described below.

The first test, Test A, used the conventional flood cooling as detailed in Example 2 and an expensive in use, commercially available, CBN cutting insert CNGA 432 KB5625. The tool, cooling method, and cutting speed selected for Test A represent the most typical, standard industrial machining conditions that have been developed during recent years by trial and error and adopted to optimize tool life (i.e. tool cost and productivity) against resultant residual stresses which, ideally, should be highly compressive but may become more tensile when the tool is worn or the speed is higher. The next three tests, B, C, and D, used an inexpensive, $Al_2O_3$—TiC based cutting insert detailed in Example 4. The cutting speed, corresponding to the production rate, that was selected for Tests B-D was over 3.7-times higher than the conventional, represented by Test A.

Table 6 presents the key conditions and cooling methods used for all four tests. Each cryogenic test used LIN as a cooling medium and a confining jet nozzle type shown in FIG. 2E. The shape of the constricting orifice in that nozzle was rectangular, and the size was 0.080 inches by 0.025 inches plus or minus 0.010 inches. The impingement angle ($\alpha$) was relatively steep (65°) and the spread angle ($\beta$) was narrow (25°) in order to maximize tool cooling effect over the entire length of tool-work contact arc. An additional cooling and hardening of work material was provided in Tests C and D by the simultaneous use of a secondary nozzle, a simple CD nozzle with the restricting orifice (throat) diameter of 0.035 inches plus or minus 0.005 inches. The secondary nozzle was aimed at the insert's rake and cutting edge on the trailing side of the contact length, i.e. just downstream of the axis of the LIN jet formed by the primary, confining jet nozzle.

Figure 6:
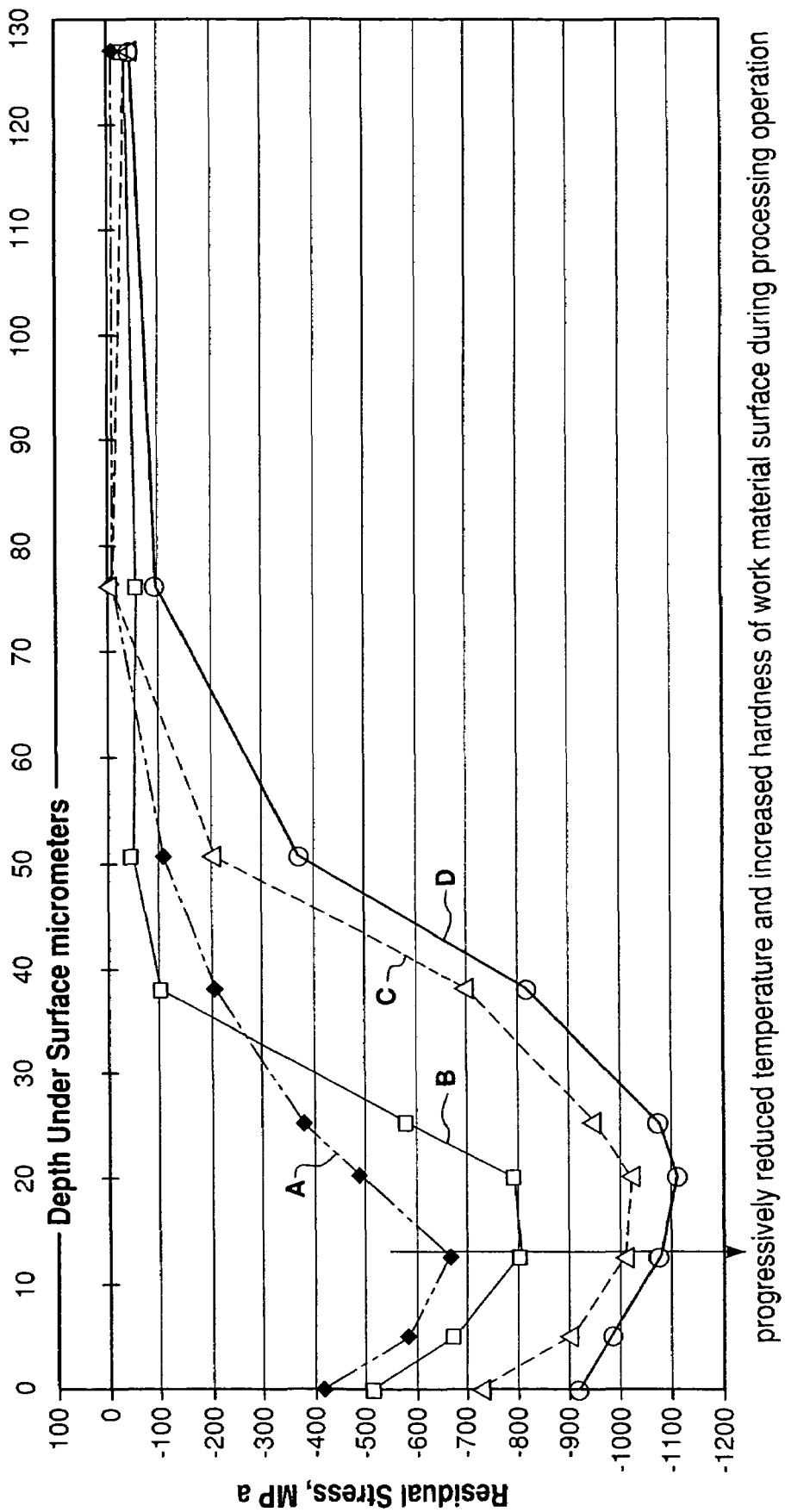
FIG. 6 is a graph showing the effect of cooling method used during finish-turning on residual stress distribution in and under the surface of a prehardened steel, M50 grade.

Residual stresses were measured on the rings machined under the presented conditions using the standard X-ray diffraction method based on the change of lattice spacing as described in the "Handbook of Residual Stress and Deformation of Steel", Edited by G. Totten etal., ASM International, Ohio, 2002, pp. 112-113. An additional procedure of a repeated, step-wise X-ray measurement and electroetching a thin layer of tested material was used in order to define stress distribution deeper under the material surface. The step-wise procedure, commonly used in the manufacturing industries, has been described by E. Brinks et al. in publication "Residual Stresses—Measurement and Causes in Machining Processes", Annals of the CIRP, Vol. 31/2/1982, pp. 491-510. Results of the X-ray measurements of residual stress distribution are plotted in FIG. 6.

The plots show that residual stress is compressive in all four cases but the use of cryogenic cooling significantly increases the degree of the surface compression and the depth to which compressive stress can penetrate the material processed. The best results are obtained for Test C and Test D, both using the most cooling and hardening, double nozzle arrangement. Test C results in slightly less compressive stresses than Test D because the depth of its cut is 50% higher, i.e., the amount of heat entering the material, or the degree of material softening is higher. By maintaining work surface and tool material cool and hard, the disclosed cryogenic method and apparatus enable the use of less expensive tools which can cut faster and work more productively than the conventional, CBN tools. Moreover, in spite of increased cutting speeds, the disclosed cryogenic method enhances the compressive residual stress (i.e. surface integrity), thus diminishing the need for additional downstream operations such as polishing-away of the tensile-stressed surface, peening, tumbling, burnishing, deep-rolling, and similar manufacturing steps conventionally used to restore compressive stresses in machined and formed parts.

The present invention produces work surfaces characterized by an improved surface finish and surface integrity which is achieved without shortening the life of the cutting tool. This enables the manufacturing industry to skip certain up-stream and/or down-stream manufacturing steps, e.g., soft roughing, and grinding/polishing, peening, burnishing, and deburring. Also, when used in cryogenic machining, the present invention allows the user to skip the cleaning steps. In sum, the present invention provides a new capability of producing parts faster, at lower unit cost, and using less capital.

It should be recognized by those skill in the art, that the present invention enables improvements in product quality and reductions in production costs in numerous industrial segments including machinery, mining, energy, transportation, electric, electronic, optical, and medical component and equipment manufacturers. Examples of components which can be manufactured according to the present invention include metal sheet, strip, extrusion, profiled shapes and stampings, stamping tools, dies, molds, drills, rolls, shafts, bearings, bushings, spindles, rings, cylinders, valves, fasteners, fittings, wheels, gears, blades, gages and other measurement instruments, electrodes, heat-sinks, microchip packag-

TABLE 6

| Test | Cutting speed (ft/minute) | Depth of cut (inches) | Cooling method | Cryogenic nozzle type(s) used | Remarks |
| --- | --- | --- | --- | --- | --- |
| A | 350 | 0.010 | Emulsion flooded from 28 psig back pressure | None | Low heat input generated by machining |
| B | 1300 | 0.010 | LIN jetted from 100 psig back pressure | Confined jet nozzle shown in FIG. 2E | High heat input generated by machining |
| C | 1300 | 0.015 | LIN jetted from 100 psig back pressure | Two nozzles used: [1] confined jet nozzle shown in FIG. 2E and [2] CD nozzle shown in FIG. 2A | The highest heat input generated by machining |
| D | 1300 | 0.010 | LIN jetted from 100 psig back pressure | Two nozzles used: [1] confined jet nozzle shown in FIG. 2E and [2] CD nozzle shown in FIG. 2A | High heat input generated by machining |

The invention claimed is:

1. A method for improving at least one of a surface finish and a surface integrity of a workpiece formed or shaped with a tool, the workpiece having a surface hardness, comprising increasing the surface hardness of the workpiece during forming or shaping of the workpiece with the tool by jetting cryogenic fluid from a jet of the cryogenic fluid at at least a portion of the tool at an impingement angle (α) greater than about 30° and less than about 90°, and then said cryogenic fluid impinges the workpiece at a spread angle (β) wherein the spread angle (β) is such that the cryogenic fluid impinges at least the entire length of contact between the tool and the workpiece.

2. A method as in claim 1, wherein said method further comprises the step of impinging at least a portion of said workpiece or at least a portion of said tool with cryogenic fluid from a second jet of cryogenic fluid.

3. A method as in claim 1, wherein the jet of the cryogenic fluid impinges on the surface of the workpiece at a spread angle (β) greater than about 0° and less than about 180°.

4. The method of claim 1 wherein said tool is a cutting tool comprising a rake face, and said at least a portion of the tool is at least a portion of the rake face.

5. A method for improving at least one of a surface finish and a surface integrity of a workpiece formed or shaped with a tool, comprising the steps of:
providing a supply of a cryogen;
providing a nozzle adjacent the workpiece, the nozzle having
at least one inlet adapted to receive a flow of the cryogen,
an upstream portion in fluid communication with the at least one inlet, the upstream portion adapted to receive at least a portion of the flow of the cryogen from the at least one inlet,
a downstream portion in fluid communication with the upstream portion and adapted to receive at least a portion of the flow of the cryogen from the upstream portion, and
at least one outlet in fluid communication with the downstream portion and adapted to receive and transmit from the downstream portion at least a portion of the flow of the cryogen;
delivering a portion of the cryogen to the at least one inlet of the nozzle, wherein the cryogen is at least partially separated within the downstream portion of the nozzle into a condensed phase portion and a vapor portion; and
jetting at least a portion of an expanding jet of the condensed phase portion and the vapor portion from the at least one outlet of the nozzle to the tool and a surface of the workpiece.

6. A method as in claim 5, wherein the downstream portion of the nozzle has at least one diverging wall and at least one converging wall adapted to converge on the expanding jet.

7. A method as in claim 6, wherein the at least one diverging wall has a diverging angle and the at least one converging wall has a converging angle less than the diverging angle.

8. A method as in claim 6, wherein the diverging wall is open to an ambient atmosphere.

9. The method of claim 5 further wherein the downstream portion of the nozzle has at least one diverging wall open to an ambient atmosphere and at least one converging wall adapted to converge on the expanding jet, and wherein the at least one diverging wall has a diverging angle and the at least one converging wall has a converging angle less than the diverging angle.

10. The method of claim 1 further comprising the step of:
providing the tool adjacent the workpiece.

11. A workpiece formed or shaped by a method as in claim 10 and characterized by an improved surface finish, an improved surface integrity, or both an improved surface finish and an improved surface integrity, wherein said workpiece having a work surface roughness (Ra), wherein the work surface roughness (Ra) is eaual to or less than a theoretical low roughness limit (Ra-t), calculated as Ra-t=$f^2$/(32 r), where f is a cutting tool feedrate and r is a cutting tool nose radius.

12. The method of claim 10 wherein the workpiece contains at least one metallic alloy having at least one element selected from a group consisting of cobalt (Co), chromium (Cr), molybdenum (Mo), nickel (Ni), iron (Fe), tungsten (W), aluminum (Al), and titanium (Ti) or contains at least one polymer or at least one polymer-based composite.

13. An apparatus for improving at least one of a surface finish and a surface integrity of a workpiece formed or shaped with a tool, the workpiece having a surface hardness, comprising means for increasing the surface hardness of the workpiece during forming or shaping of the workpiece with the tool, wherein said means for increasing the surface hardness of the workpiece during forming or shaping of the workpiece with the tool comprises a jet of cryogenic fluid impinging at least a portion of the tool at an impingement angle (α) greater than about 30° and less than about 90°, and then said cryogenic fluid impinges the workpiece at a spread angle (β) wherein the spread angle (β) is such that the cryogenic fluid impinges at least the entire length of contact between the tool and the workpiece.

14. An apparatus as in claim 13, further comprising a second jet of the cryogenic fluid that impinges on a portion of the tool or a portion of a surface of the workpiece.

15. An apparatus as in claim 14, wherein the jet of the cryogenic fluid impinges on the surface of the workpiece at a spread angle (β) greater than about 0° and less than about 180°.

16. The apparatus of claim 13, said tool is a cutting tool comprising a rake face and said at least a portion of the tool is a portion of said rake face.

17. An apparatus for improving at least one of a surface finish and a surface integrity of a workpiece formed or shaped with a tool, comprising:
a supply of a cryogen;
a nozzle adjacent the workpiece, the nozzle having
at least one inlet adapted to receive a flow of the cryogen,
an upstream portion in fluid communication with the at least one inlet, the upstream portion adapted to receive at least a portion of the flow of the cryogen from the at least one inlet,
a downstream portion in fluid communication with the upstream portion and adapted to receive at least a portion of the flow of the cryogen from the upstream portion, and at least one outlet in fluid communication with the downstream portion and adapted to receive and transmit from the downstream portion at least a portion of the flow of the cryogen;

means for delivering a portion of the cryogen to the at least one inlet of the nozzle, wherein the cryogen is at least partially separated within the downstream portion of the nozzle into a condensed phase portion and a vapor portion; and means for jetting at least a portion of an expanding jet of the condensed phase portion and the vapor portion from the at least one outlet of the nozzle to the tool and a surface of the workpiece.

18. An apparatus as in claim 17, wherein the downstream portion of the nozzle has at least one diverging wall and at least one converging wall adapted to converge on the expanding jet.

19. An apparatus as in claim 18, wherein the at least one diverging wall has a diverging angle and the at least one converging wall has a converging angle less than the diverging angle.

20. An apparatus as in claim 18, wherein the diverging wall is open to an ambient atmosphere.

21. The apparatus of claim 17 wherein the downstream portion of the nozzle has at least one diverging wall open to an ambient atmosphere and at least one converging wall adapted to converge on the expanding jet, and wherein the at least one diverging wall has a diverging angle and the at least one converging wall has a converging angle less than the diverging angle.

22. The apparatus of claim 17 further comprising:
means for forming or shaping the workpiece with the tool.

23. A workpiece formed or shaped by an apparatus as in claim 22 said workpiece having a work surface roughness (Ra), wherein the work surface roughness (Ra) is equal to or less than a theoretical low roughness limit (Ra-t), calculated as Ra-t=$f^2/(32 r)$, where f is a cutting tool feedrate and r is a cutting tool nose radius.

24. The workpiece as in claim 23, wherein the workpiece contains at least one metallic alloy having at least one element selected from a group consisting of cobalt (Co), chromium (Cr), molybdenum (Mo), nickel (Ni), iron (Fe), tungsten (W), aluminum (Al), and titanium (Ti) or contains at least one polymer or at least one polymer-based composite.

25. An apparatus for machining a workpiece having a surface hardness, comprising:
a cutting tool adjacent the workpiece, the cutting tool adapted to shape the workpiece;
means for shaping the workpiece with the cutting tool; and
means for increasing the surface hardness of the workpiece during shaping of the workpiece with the cutting tool, wherein the shaped workpiece is characterized by an improved surface finish having a work surface roughness (Ra) equal to or less than a theoretical low roughness limit (Ra-t), calculated as Ra-t=$f^2/(32 r)$, where f is a cutting tool feedrate and r is a cutting tool nose radius.

26. A nozzle for jetting an expanding jet of a cryogen to a surface of a workpiece, comprising:

at least one inlet adapted to receive a flow of the cryogen;
an upstream portion in fluid communication with the at least one inlet, the upstream portion adapted to receive at least a portion of the flow of the cryogen from the at least one inlet;
a downstream portion in fluid communication with the upstream portion and adapted to receive at least a portion of the flow of the cryogen from the upstream portion;
at least one outlet in fluid communication with the downstream portion and adapted to receive and transmit from the downstream portion at least a portion of the flow of the cryogen; and
means for separating the cryogen at least partially into a condensed phase portion and a vapor portion within the downstream portion of the nozzle.

27. A nozzle as in claim 26, further comprising an internal expansion chamber adapted to confine the expanding jet of the cryogen, wherein the nozzle is adapted to clamp a cutting tool having a tool rake surface.

28. A nozzle as in claim 26, wherein the downstream portion of the nozzle has at least one diverging wall and at least one converging wall adapted to converge on the expanding jet of the cryogen.

29. A nozzle as in claim 28, wherein the diverging wall has a diverging angle and the converging wall has a converging angle less than the diverging angle.

30. A nozzle as in claim 19, wherein the diverging wall is open to an ambient atmosphere.

31. The nozzle of claim 26, further comprising an internal expansion chamber adapted to confine the expanding jet of the cryogen,
wherein the downstream portion of the nozzle has at least one diverging wall open to an ambient atmosphere and at least one converging wall adapted to converge on the expanding jet of the cryogen, and
wherein the diverging wall has a diverging angle and the converging wall has a converging angle less Than the diverging angle, and
wherein the nozzle is adapted to clamp a cutting tool having a tool rake surface.

32. The method of claim 1, further comprising the step of:
manufacturing the finished part or the finished product from the workpiece shaped or formed with the tool wherein the finished part or the finished product is manufactured tram the workplace without using at least one additional operation needed by at least one other method for manufacturing a comparable finished part or a comparable finished product which the other method forms or shapes from a comparable workpiece having a comparable surface hardness without increasing the comparable surface hardness of the comparable workpiece during forming or shaping of the comparable workpiece, said at least one additional operation being selected from a group consisting of grinding, polishing, honing, deburring, peening, tumbling, burnishing, deep rolling, soft annealing, soft machining, soft shaping, soft forming, and work part cleaning.

* * * * *